(12) United States Patent
Küchler et al.

(10) Patent No.: US 10,298,337 B2
(45) Date of Patent: May 21, 2019

(54) PROCESSING MODULE AND ASSOCIATED METHOD

(71) Applicant: NXP B.V.

(72) Inventors: Wolfgang Küchler, Graz (AT); Thomas Baier, Graz (AT); Manuel Lafer, Graz (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 15/697,073

(22) Filed: Sep. 6, 2017

(65) Prior Publication Data

US 2018/0138993 A1    May 17, 2018

(30) Foreign Application Priority Data

Nov. 11, 2016    (EP) .................................... 16198525

(51) Int. Cl.
*H04B 1/00*    (2006.01)
*H04B 17/30*    (2015.01)
(Continued)

(52) U.S. Cl.
CPC .............. *H04B 17/30* (2015.01); *G01S 7/285* (2013.01); *G01S 13/765* (2013.01);
(Continued)

(58) Field of Classification Search
CPC ..... H04B 17/30; H04L 25/0202; G01S 7/285; G01S 13/767; G01S 13/765; G07C 9/00309
(Continued)

(56) References Cited

U.S. PATENT DOCUMENTS

| | | |
|---|---|---|
| 6,453,168 B1 | 9/2002 | McCrady et al. |
| 7,149,239 B2 | 12/2006 | Hudson |

(Continued)

FOREIGN PATENT DOCUMENTS

| | | |
|---|---|---|
| DE | 601 02 616 T2 | 3/2005 |
| WO | 2013/070275 A1 | 5/2013 |
| WO | 2013070275 A1 | 5/2013 |

OTHER PUBLICATIONS

Poturalski et al. "The cicada attack: Degradation and denial of service in IR ranging", 2010 IEEE International Conference on Ultra-Wideband, Nanjing, pp. 1-4 (2010).
(Continued)

*Primary Examiner* — Dhaval V Patel
(74) *Attorney, Agent, or Firm* — Rajeev Madnawat

(57) ABSTRACT

A processing module for a receiver device. The processor module comprises a channel estimate generation component arranged to output channel estimate information for a received signal, and a timestamping module arranged to determine a ToA measurement for a marker within a packet of the received signal based at least partly on the channel estimate information for the received signal generated by the channel estimate generation component. The channel estimate generation component comprises a validation component arranged to derive a validation pattern for the packet within the received signal for which a ToA measurement is to be determined, identify a section of the packet containing a validation sequence, and perform cross-correlation between at least a part of the validation sequence within the packet and at least a part of the validation pattern to generate channel estimate validation information.

15 Claims, 25 Drawing Sheets

(51) Int. Cl.
*H04L 25/02* (2006.01)
*G01S 7/285* (2006.01)
*G01S 13/76* (2006.01)
*G07C 9/00* (2006.01)

(52) U.S. Cl.
CPC ........ *G01S 13/767* (2013.01); *H04L 25/0202* (2013.01); *G07C 9/00309* (2013.01)

(58) Field of Classification Search
USPC ................ 375/130, 138, 144, 260, 267, 355
See application file for complete search history.

(56) References Cited

U.S. PATENT DOCUMENTS

| | | | |
|---|---|---|---|
| 8,472,500 B2 * | 6/2013 | Marton | ................ H04B 1/7183 370/519 |
| 2003/0043887 A1 * | 3/2003 | Hudson | ................ H04L 1/0618 375/144 |
| 2009/0046792 A1 | 2/2009 | Ku et al. | |
| 2010/0135178 A1 | 6/2010 | Aggarwal et al. | |
| 2010/0226463 A1 | 9/2010 | Wang et al. | |
| 2010/0260207 A1 | 10/2010 | Simmons | |
| 2015/0349917 A1 | 12/2015 | Skaaksrud | |
| 2016/0234684 A1 | 8/2016 | Hekstra et al. | |
| 2016/0350987 A1 * | 12/2016 | Zivkovic | ............ G07C 9/00007 |
| 2017/0013403 A1 | 1/2017 | Sen | |

OTHER PUBLICATIONS

Poturalski et al. "Distance Bounding with IEEE 802.15.4a: Attacks and Countermeasures", IEEE Transactions on Wireless Communications, vol. 10, No. 4, pp. 1334-1344 (Apr. 2011).

Flury et al "Effectiveness of Distance-Decreasing Attacks Against Impulse Radio Ranging", 3rd ACM Conference on Wireless Network Security, pp. 117-128 (2010).

Poturalski et al. "On Secure and Precise IR-UWB Ranging", IEEE Transactions on Wireless Communications, vol. 11, No. 3, pp. 1087-1099 (Mar. 2012).

Non-Final Office Action dated Oct. 1, 2018 for U.S. Appl. No. 15/611,014 12 pgs.

IEEE Computer Society "IEEE Standard for Low-Rate Wireless Personal Area Networks (WPANs)", IEEE Sidgo2.15.4™ (Revision of IEEE Sid 802.15.4-2011), 709 pgs. (2015).

IEEE Computer Society "IEEE Standard for Low-Rate Wireless Personal Area Networks (WPANs)", IEEE Std 802.15.4™ (Revision of IEEE Std 802.15.4-2011), 709 pgs. (2015).

Notice of Allowance dated Feb. 21, 2019 for U.S. Appl. No. 15/611,014 7 pgs.

\* cited by examiner

PROCESSING MODULE AND ASSOCIATED METHOD

CROSS-REFERENCE TO RELATED APPLICATIONS

This application claims the priority under 35 U.S.C. § 119 of European Patent application no. 16198525.4, filed on Nov. 11, 2016, the contents of which are incorporated by reference herein.

FIELD OF THE INVENTION

This invention relates to a processing module for a communication device and a method therefor of estimation of a propagation channel model.

BACKGROUND OF THE INVENTION

Wideband Radio Frequency (RF) applications have been developed that are capable of accurate distance measurement between two or more wireless devices. These measurements are based on Time-of-Flight (ToF) calculations which are derived by accurate determination of departure and arrival times of RF packets between two devices. RF packets travel at the speed of light and thus a calculated ToF allows determination of the distance between devices. Such a procedure is commonly called 'Ranging'. One practical application of Ranging is 'Distance Bounding' whereby ToF calculations are used to verify whether the distance between two devices is less than a predefined threshold, such as used for automotive Passive Keyless Entry (PKE) systems and other access control systems, as well as for contactless electronic payment systems.

FIG. 1 illustrates the principle of calculating the ToF between two devices, A and B, using Time-of-Arrival (ToA) and Time-of-Departure (ToD) measurements for RF packets transmitted there between. The procedure starts with Device A transmitting a 'Request' packet to Device B with a measured ToD ($t_{todA}$). Upon receipt of the Request packet, Device B measures the ToA ($t_{oaB}$) and transmits a 'Response' packet back to Device A with a measured (or predetermined) ToD ($t_{todB}$). Upon receipt of the Response packet, Device A measures the ToA of the Response packet ($t_{toaA}$). From the measured (or otherwise derived) ToDs and ToAs, a roundtrip duration ($T_{rtt}=t_{todA}-t_{toaA}$) and a response duration ($T_{rsp}=t_{toaB}-t_{todB}$) can be calculated. The ToF between the devices A and B may then be estimated from the roundtrip duration and response duration: ToF=0.5*($T_{rtt}-T_{rsp}$).

In a multipath environment, the ToAs for the most direct (shortest) path, i.e. the 'Line-of-Sight' (LoS) path, between the two devices should be measured and used for accurately calculating the distance between two devices. Accordingly, the first arriving path for the respective RF packet needs to be found. In order to enable a receiving device to identify the first arriving path for an RF packet, the receiving device derives a channel estimate to describe the multipath environment. FIG. 2 illustrates an example of such a channel estimate, with the first non-zero tap, such as indicated at 200 in FIG. 2, typically representing the first path within the multipath environment between the two devices. Significantly, the LoS path signal may not be the strongest signal received by the receiver, for example when a blocking object is located directly between the transmitting device and the receiving device. As such, the tap 200 within the channel estimate representing the LoS path may not have the highest amplitude within the channel estimate.

Accordingly, the LoS path within a multipath environment is conventionally found by identifying the first non-zero tap within the channel estimate.

A receiving device is able to derive a channel estimate in relation to a transmitting device using known patterns within a received packet from the transmitting device. For example, in IR-UWB (Impulse Radio-Ultra-WideBand) systems, such as defined in IEEE 802.15.4, a preamble comprising repeating synchronisation symbols and a Start-of-Frame Delimiter (SFD) is placed in front of a payload segment. In IR-UWB receivers, the repeating synchronisation symbols within the preamble of a received packet are typically used to derive a channel estimate for the received packet.

However, conventional approaches to identifying the LoS path for a multi-channel environment are susceptible to 'attacks' that can result in a false 'first' path being detected, and thus an incorrect (early) ToA measurements being taken. One example of such an attack is known as the 'Cicada' attack, as described in "The Cicada Attack: Degradation and Denial of Service in IR Ranging"; Marcin Poturalski, Manuel Flury, Panos Papadimitratos, Jean-Pierre Hubaux, Jean-Yves Le Boudec; 2010 IEEE International Conference on Ultra-Wideband. A Cicada attack is employed by an 'illegitimate' transmitter blindly transmitting a sequence of pulses. If the adversarial pulse rate matches the symbol rate used by a receiver of the legitimate signal to derive a channel estimate, then the adversarial pulses will affect the channel estimate derived by the receiver. Since these adversarial pulses are unsynchronised with the legitimate transmitted signal, they (impulse responses) will be time-shifted randomly with respect to symbols being transmitted within the legitimate signal. Accordingly, there is a likelihood that for some of the symbols transmitted within the legitimate signal the adversarial pulses will induce a sporadic illegitimate LoS path located ahead of the legitimate LoS path within the channel estimate derived by the receiving device, and thus cause a false first path to be detected and an early ToA measurement to be taken. By causing an early ToA measurement to be taken, the subsequent ToF calculation will be based on the early ToA measurement, resulting in a shortened ToF to be calculated, which in turn will result in a shortened distance between the legitimate transmitter device and receiver device to be estimated. Since there is no synchronization to the legitimate signal, the actual distance gain is hard to predict. However in many scenarios the attacker does not need to succeed in the first attempt. Significantly, the attacking device only requires knowledge of the symbol period used for deriving the channel estimate to employ the Cicada attack, information which is often publically available, for example defined within standards etc.

A more sophisticated attack is described in "Effectiveness of Distance-Decreasing Attacks Against Impulse Radio Ranging"; Manuel Flury, Marcin Poturalski, Panos Papadimitratos, Jean-Pierre Hubaux, Jean-Yves Le Boudec; 3rd ACM Conference on Wireless Network Security, 2010. In this attack, the attacking device synchronises to the legitimate signal first, and then transmits the adversarial sequence of pulses with a specific timing offset. In this manner, the attacking device is able to control the relative timing of the adversarial sequence of pulses with respect to the legitimate signal. As a result, the attacking device is able to control where the adversarial pulses will be located within the channel estimate derived by the receiving device, and thus control how much of a distance gain is achieved.

Significantly, since the synchronisation symbols are in many cases used for deriving the channel estimate within a receiving device, the attacking device only requires knowledge of the synchronisation symbol pattern and symbol period to employ this second attack.

SUMMARY OF THE INVENTION

The disclosure provides a processor module for a communication receiver device, a corresponding communication receiver device, a processor module for a communication transmitter device, a corresponding communication transmitter device and a method for generating channel estimate information as described in the accompanying claims.

Specific examples of the invention are set forth in the dependent claims. These and other aspects of the invention will be apparent from and elucidated with reference to the examples described hereinafter.

In an example processing module for a communication receiver device arranged to receive a signal transmitted by a transmitter device; the processor module comprises:

a channel estimate generation component arranged to output channel estimate information for the received signal; and a timestamping module arranged to determine a Time-of-Arrival, ToA, measurement for a packet within the received signal based at least partly on the channel estimate information for the received signal generated by the channel estimate generation component;

wherein the channel estimate generation component comprises a validation component arranged to:

derive a validation pattern for the packet within the received signal for which a ToA measurement is to be determined;

identify a section of the packet containing a validation sequence; and perform cross-correlation between at least a part of the validation sequence within the packet and at least a part of the generated validation pattern to generate channel estimate validation information.

In another example processing module for a communication receiver device arranged to receive a signal transmitted by a transmitter device; the processor module comprising:

a channel estimate generation component arranged to output channel estimate information for the received signal; and a timestamping module arranged to determine a Time-of-Arrival, ToA, measurement for a packet within the received signal based at least partly on the channel estimate information for the received signal generated by the channel estimate generation component;

wherein the channel estimate generation component comprises a validation component arranged to:

derive a validation pattern for the packet within the received signal for which a ToA measurement is to be determined;

identify a section of the packet containing a validation sequence; and perform cross-correlation between at least a part of the received signal of the validation sequence within the packet and at least a part of the validation pattern to generate validated channel estimate information.

The channel estimate information may be channel estimate validation information, or channel estimate. The validation sequence and the validation pattern may be used to generate the ToA directly. The channel estimate information may be time of arrival (ToA) information.

The validation component may be configured to compensate for non-ideal auto-correlation properties of the validation sequence on the generation of the validated channel estimate information. Such compensation may be achieved by one or more of:

modifying a result of the cross-correlation between at least a part of the validation sequence within the packet and at least a part of the validation pattern. In this way, interference with channel estimate information from cross-correlation side-lobes may be suppressed.

using unvalidated channel estimate information. The unvalidated channel estimate information may be used in combination with a secure channel estimate in order to benefit from the improved security of the secure channel estimate and the better auto-correlation properties of the unvalidated channel estimate information.

modifying the validation pattern and thereby modifying the cross-correlation of the received signal of the validation sequence with the validation pattern in order to generate the validated channel estimate information. In this way, the cross-correlation properties of the received validation sequence with the validation pattern may be improved in order to improve weak signal path detection.

The unvalidated channel estimate information may be an insecure channel impulse response estimate and may be based on a channel impulse response of a preamble with better (or even optimum) auto-correlation properties than the validation sequence. The preamble may comprise a stream of repeated symbols to enable synchronization.

The validation component may be arranged to independently derive the validation sequence that corresponds to the received validation sequence. The validation component may be arranged to perform cross-correlation between at least a part of the derived validation sequence and at least a part of the validation pattern.

The validation component may be arranged to select at least one tap in the result of the cross-correlation between at least a part of the received signal of the validation sequence within the packet and at least a part of the validation pattern for which channel estimate information is to be generated or validated. The validation component may be arranged to provide modified channel estimate information by modifying one or more values of the result of the cross-correlation of the derived validation sequence with the validation pattern associated with at least one tap. Modifying one or more values may comprise reducing the one or more values or setting the one or more values to zero. Channel estimate information may be generated based on the modified cross-correlation.

The validation component may be arranged to receive unvalidated (or insecure) channel estimate information for the received signal. The validation component may be arranged to generate intermediate channel estimate information based on a convolution of the unvalidated channel estimate information and the result of the cross-correlation of the derived validation sequence with the validation pattern.

The validation component may be arranged to select at least one channel estimate tap for which channel estimate information is to be generated based on the unvalidated channel estimate information. The validation component may be arranged to provide modified unvalidated channel estimate information by modifying one or more values of the unvalidated channel estimate information associated with the at least one channel estimate tap.

The validation component may be arranged to generate intermediate channel estimate information based on combining, or convolving, the secure channel estimate and the result of the cross-correlation of the validation sequence with the validation pattern.

The validation component may be arranged to subtract the validated channel estimate information from the intermediate channel estimate information, or vice versa, in order to output channel estimate information.

The validation component may be configured to determine whether the unvalidated channel estimate information for the at least one selected channel estimate tap is valid based at least partly on the validated channel estimate information for the at least one selected channel estimate tap. The timestamping module may be configured to output an indication of whether the generated channel estimate information for the at least one selected channel estimate tap is valid based on said determination. The validation component may be further arranged to replace unvalidated channel estimate information for the at least one selected channel estimate tap with validated channel estimate tap values for the at least one selected tap and to output validated channel estimate information to the timestamping module comprising the validated channel estimate tap values for the at least one selected tap.

The validation component may be arranged to i) modify the derived validation sequence to provide a modified validation pattern. The validation component may be arranged to ii) compare a correlation property of at least part (e.g. a segment) of the derived validation sequence with a corresponding property of the modified validation pattern. The validation component may be arranged to iii) use the modified validation pattern to generate validated channel estimate information if the correlation property of the modified validation pattern is better than the correlation property of the derived validation sequence/a previously used modified validation pattern. Steps (i) to (iii) may be performed iteratively. The property of at least part of the derived validation sequence and the corresponding property of the side-lobes may be the energy in the side-lobes of the cross-correlation.

The validation component may be arranged to separate the derived validation pattern into segments. The validation component may be arranged to generate the modified validation pattern by inverting one or more bits of each segment. In this way, computational effort associated with generating the modified validation pattern may be reduced compared to performing global optimization of the whole cross correlation. The validation component may be arranged to only modify or compare correlation properties for segments associated with a shorter time-of-flight than an identified tap.

Time hopping or pulse position modulation may be applied to the validation pattern or validation sequence in the packet. The validation component may be arranged to demodulate the validation pattern or validation sequence in the packet.

The validation component may be arranged to authenticate the origin of the received signal based on a comparison of the validation sequence and the validation pattern.

The validation component may be arranged to demodulate one or more sub-segments of the received signal of the validation sequence within the packet in order to authenticate the origin of the received signal.

According to a further aspect of the disclosure is a processing module for a communication transmitter device arranged to transmit a signal to a receiver device comprising a packet for which a Time-of-Arrival, ToA, measurement is to be determined; the processing module being arranged to:
derive a validation sequence for the packet for which a ToA measurement is to be determined;
identify a section of the packet to contain the validation sequence; and
generate the packet comprising the validation sequence.

Time hopping or pulse position modulation may be applied to the validation sequence in the packet in order to improve auto-correlation of the validation sequence.

The processing module may be further configured to modulate at least part of the validation sequence to enable authentication of the processing module by the receiver device.

The validation component may be arranged to receive unvalidated channel estimate information for the received signal. The validation component may be arranged to select at least one channel estimate tap for which channel estimate validation information is to be generated based on the unvalidated channel estimate information. The validation component may be arranged to perform cross-correlation between at least a part of the validation sequence within the packet and at least a part of the generated validation pattern to generate channel estimate validation information for the at least one selected channel estimate tap. The validation component may be further arranged to determine whether the unvalidated channel estimate information for the at least one selected channel estimate tap is valid based at least partly on the generated channel estimate validation information for the at least one selected channel estimate tap. The validation component may be further arranged to output to the timestamping module an indication of whether the generated channel estimate information for the at least one selected channel estimate tap is valid based on said determination.

The validation component may be further arranged to replace unvalidated channel estimate information for the at least one selected channel estimate tap with validated channel estimate tap values for the at least one selected tap and to output validated channel estimate information to the timestamping module comprising the validated channel estimate tap values for the at least one selected tap.

The channel estimate generator may comprise a symbol correlator. The symbol correlator may be arranged to perform cross-correlation of the received signal with a reference pattern. The symbol correlator may be arranged to output a resulting correlation signal from which the channel estimate generator may be arranged to generate channel estimate information. The validation component may be arranged to reconfigure the symbol correlator to perform cross-correlation between the validation sequence within the packet within the received signal and the generated validation pattern.

The validation component may be arranged to generate a non-repeating symbol validation pattern. The validation component may be arranged to generate the validation pattern based on at least one of: a pseudo random number generator function; a cryptographically secure pseudo random number generator function; a hash function; a secure hash function; or any algorithm which allows generation of non-predictable sequences, only determinable for the legitimate communication parties.

The validation component may be arranged to generate the validation pattern comprising at least one of: a validation code pattern; a validation code position pattern; and a validation code interleaving sequence. The section of the packet containing the validation sequence may comprise at least one of: a preamble of the packet; a part of a preamble of the packet; time-multiplexed segments within a payload of the packet; and segments interleaved with payload segments.

A communication receiver device arranged to receive a signal transmitted by a transmitter device; the communication receiver device comprising at least one processing module according to any one of the preceding Claims.

The communication receiver device comprises at least one of: a Impulse Radio Ultra-WideBand (UWB) receiver device; light/laser ranging receiver device; and sound-based ranging receiver device.

Also disclosed is a processing module for a communication transmitter device arranged to transmit a signal to a receiver device comprising a packet for which a Time-of-Arrival, ToA, measurement is to be determined; the processing module being arranged to: derive a validation pattern for the packet for which a ToA measurement is to be determined; identify a section of the packet to contain a validation sequence; and generate the packet comprising the validation sequence corresponding to the derived validation pattern.

Also disclosed is a communication transmitter device arranged to transmit a signal to a receiver device; the communication transmitter device comprising at least one processing module. The communication transmitter device comprises at least one of: a Impulse Radio Ultra-WideBand transmitter device; light/laser ranging transmitter device; and sound-based ranging transmitter device.

Also disclosed is a method for generating channel estimate information within a communication receiver device for determining a Time-of-Arrival, ToA, measurement for a packet within a received signal; the method comprising:

deriving a validation pattern for the packet within the received signal for which a ToA measurement is to be determined;

identifying a section of the packet containing a validation sequence; and performing cross-correlation between at least a part of the validation sequence within the packet and at least a part of the generated validation pattern to generate channel estimate validation information.

BRIEF DESCRIPTION OF THE DRAWINGS

Further details, aspects and examples of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EXAMPLES

According to example examples, there are provided processing modules for transmitter and receiver devices arranged to transmit and receive respectively a signal comprising a packet having therein a validation sequence. The validation sequence sent by the transmitter enables the receiver device to validate channel estimate information for the transmission channel between the two devices by correlating the received signal with a derived validation pattern, thereby enabling ToA attacks such as Cicada attacks and (a)synchronous preamble injection attacks to be mitigated and detected.

Example examples are herein described with reference to a radio frequency (RF) communication device. However, it is contemplated that examples are not limited to being implemented solely within RF communication devices and examples may be applicable to any system in which ToA measurements are required to be determined, and is particular applicable to any system in which a Time-of-Flight (ToF) distance measurement is a specified function, such as IR-UWB (Impulse Radio-Ultra WideBand) radio frequency (RF) transceivers, pulse radars at 60 GHz and higher frequencies, and pulse-based light/laser ranging transceivers. Thus it is contemplated that examples may be implemented within a range of different communication systems including, but not limited to, RF communication systems, optical (e.g. light/laser) communication systems, sound-based communication systems, etc. The applications may range from automotive Passive Keyless Entry (PKE) systems and other access control systems to (contactless) electronic payment systems, and in particular to any application where ranging and distance bounding is performed.

Figure 3:
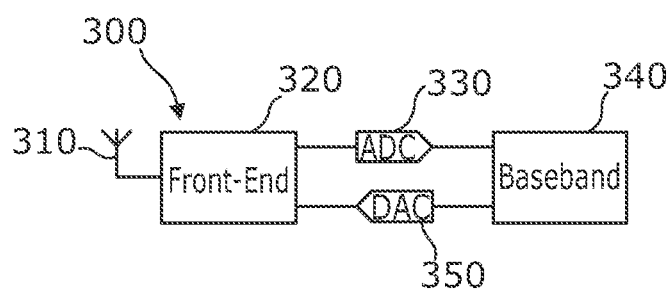
FIG. 3 illustrates a simplified block diagram of an example of part of a wireless radio frequency (RF) device.

Referring now to FIG. 3, there is illustrated a simplified block diagram of an example of part of a wireless radio frequency (RF) communication device 300. The communication device 300 includes an antenna 310 for receiving and transmitting RF signals over an air interface. The antenna 310 is coupled to front-end circuitry 320. The front-end circuit 320 typically consists of a receive path including, for example, a low noise amplifier, mixer and band-pass filter, and a transmit path including, for example, a mixer, filter and power amplifier. The receive path of the front-end circuit 320 is coupled to a baseband processing module 340 of the communication device 300 via an analogue-to-digital converter (ADC) 330, via which received signals are passed from the front-end circuit 320 to the baseband processing module 340. The transmit path of the front-end circuit 320 is coupled to the baseband processing module 340 via a digital-to-analogue converter (DAC) 350, via which signals to be transmitted are passed from the baseband processing module 340 to the front-end circuit 320.

Figure 4:
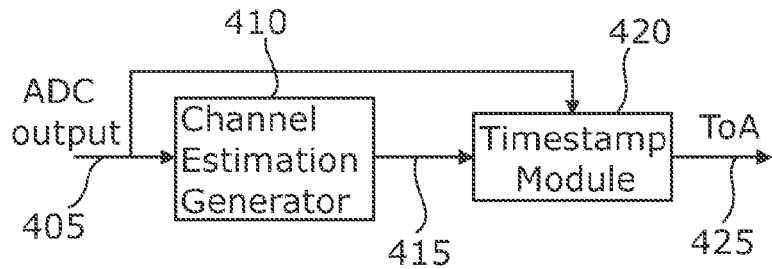
FIG. 4 illustrates a simplified block diagram of a part of a baseband processing module.

According to some example examples, the baseband processing module 340 of the communication device 300 is arranged to perform Time-of-Arrival (ToA) measurements on data packets within received RF signals. FIG. 4 illustrates a simplified block diagram of a part of the baseband processing module 340 arranged to perform ToA measurements on received data packets. A channel estimate generator component 410 is arranged to receive the digital representation of the received RF signal 405 output by the ADC 330 and to generate channel estimate information 415 for a multipath transmission channel between the communication device 300 and a transmitter device from which the received RF signal is being transmitted. A timestamp module 420 is arranged to receive the channel estimate information 415 generated by the channel estimate generation component 410, and the digital representation of the received RF signal 405, and to determine a ToA measurement 425 for a marker within a packet within the received RF signal based at least partly on the channel estimate information 415. For example, a signal received via a multipath channel will comprise a plurality of multipath components, which will show up in the taps of the channel impulse response estimate. The timestamp module 420 may be arranged to identify a Line-of-Sight (LoS) component of the received signal based on the channel estimate information 415, and to determine a ToA measurement 425 for a marker within the packet for the LoS component of the received signal.

Figure 5:
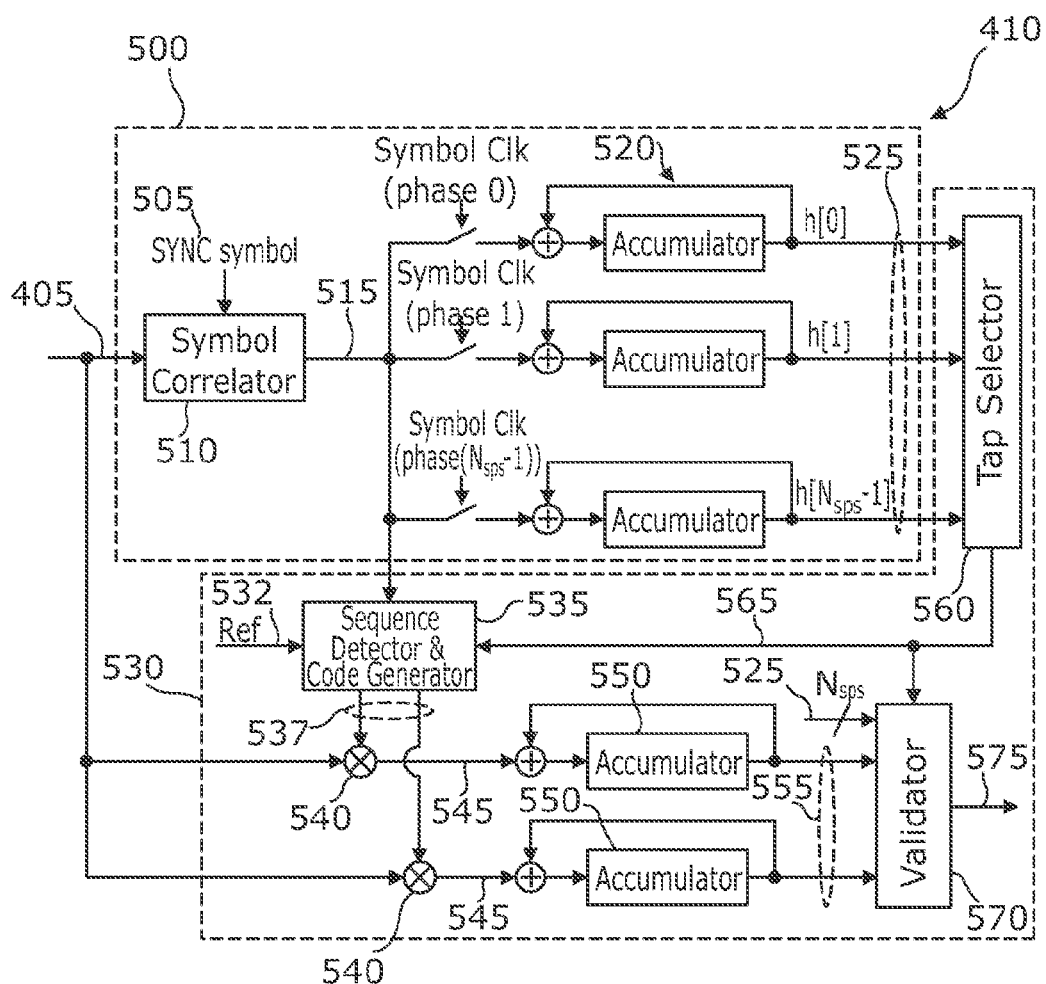
FIG. 5 illustrates a simplified block diagram of an example of a channel estimate generation component.

FIG. 5 illustrates a simplified block diagram of an example of the channel estimate generation component 410. For the example illustrated in FIG. 5, the channel estimate generation component 410 comprises a channel estimation component 500. The channel estimation component 500 including a symbol correlator 510 arranged to receive the digital representation of the received RF signal 405 output by the ADC 330, and to perform cross-correlation of the received signal 405 with a reference pattern, which in the illustrated example consists of a synchronisation symbol 505, and to output a resulting correlation signal 515. The correlation signal 515 output by the symbol correlator 510 is fed to a plurality of accumulator circuits, indicated generally at 520 via switches, the switches being controlled such that each accumulator circuit 520 is arranged to receive the correlation signal 515 output by the symbol correlator 510 at a specific (down-sampling) phase within each successive correlation window. In this manner, each accumulator circuit 520 is arranged to accumulate a symbol correlation value h[i] for a received signal corresponding to a particular multipath component of the transmission channel, with the combined symbol correlation values h[0] to h[$N_{sps}-1$], $N_{sps}$ defining the number of samples per symbol, forming (unvalidated) channel estimate information 525 for the multipath transmission channel output by the channel estimation component 500, whereby each symbol correlation value h[i] comprises a channel estimate tap value within the (unvalidated) channel estimate information 525 for the multipath transmission channel.

The channel estimate generation component 410 further includes a validation component 530. The validation component 530 in the example illustrated in FIG. 5 is arranged to receive a validation pattern reference 532 for a packet for which a ToA is to be determined, generate a validation pattern based at least partly on the validation pattern reference 532, identify a section within the packet comprising a validation sequence, and perform cross-correlation between at least a part of the validation sequence within the packet and at least a part of the generated validation pattern to generate validated channel estimate information.

Significantly, the validation pattern generated (or otherwise derived) by the validation component 530 is required to correspond to the validation sequence within the received packet.

Accordingly, the validation pattern reference 532 is required to be known by both the transmitting device and the receiving device. To mitigate the attacks identified in the background of the invention, it is contemplated that the validation pattern and validation sequence be unknown and not predictable for an attacker. This can be achieved using Cryptographically-Secure Pseudo-Random-Number-Generators (CSPRNG) where a validation pattern reference 532 in the form of a seed is mutually agreed by, for example, a challenge/response scheme between the legitimate transmitter and receiver devices. In some alternative examples, the validation pattern reference 532 may comprise the validation pattern itself. The validation sequence(s) may also be sufficiently long to avoid guessing attacks and to provide good auto-correlation (low side-lobes) properties. The hardware effort can be kept low by maintaining existing synchronization mechanisms. The validation sequences are then applied after the receiver is already synchronized (either by providing the validation sequence(s) in the same packet, or within succeeding packets). In addition, it is contemplated that a non-repeating-symbol validation pattern (i.e. a validation pattern comprising no repeating symbols) be used. By avoiding repeatable symbols within the validation sequence(s), cicada attacks may be further mitigated.

A secure and non-predictable validation pattern used to form the validation sequence may be achieved by using, for example, a Cryptographically-Secure Pseudo-Random Number Generator (CSPRNG) to generate a time-varying validation pattern. For the example illustrated in FIG. 5, the sequence detector and code generator component 535 may comprise a CSPRNG and the validation pattern reference 532 may thus comprise a seed value, also known to the transmitting device, used by the CSPRNG of the sequence detector and code generator component 535 to generate the validation pattern.

Figure 6:
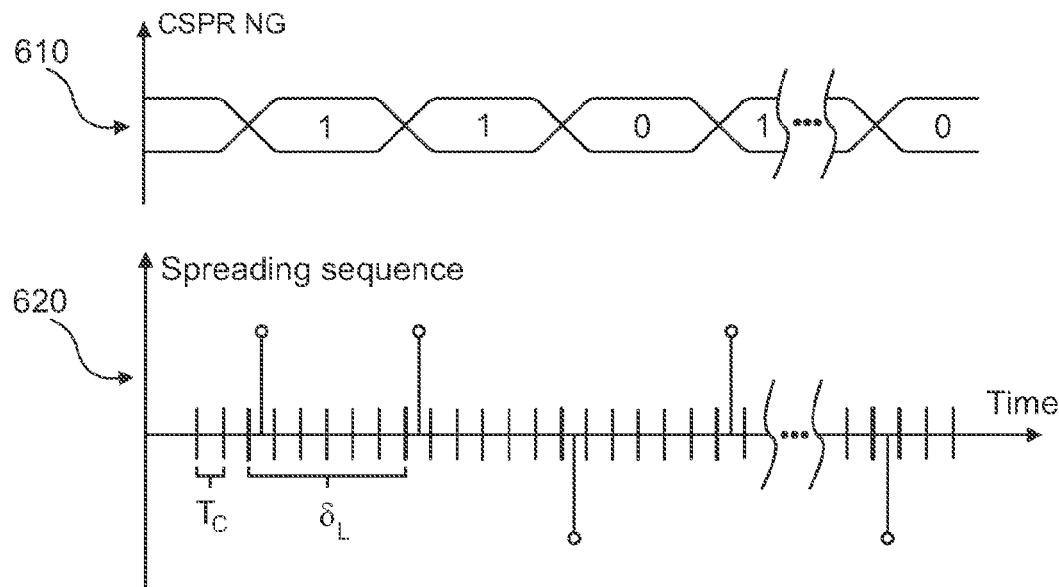
FIGS. 6 to 8 illustrate examples of validation patterns and corresponding validation sequences within IR-UWB packets.

FIG. 6 illustrates an example of a validation pattern 610 and corresponding validation sequence 620 within a IR-UWB packet. Compared to ordinary Direct-Sequence Spread Spectrum (DSSS), IR-UWB according to IEEE 802.15.4 defines a certain up-sampling factor $\delta_L$ which is used to derive a specific average Pulse Repetition Frequency (PRF). For IR-UWB applications, a CSPRNG can also be used to generate pseudo-random time-hopping positions for each pulse and/or validation code interleaving sequences for each pulse. The generation of code and time-hopping positions may be provided by one single CSPRNG or by separate generators.

Figure 7:
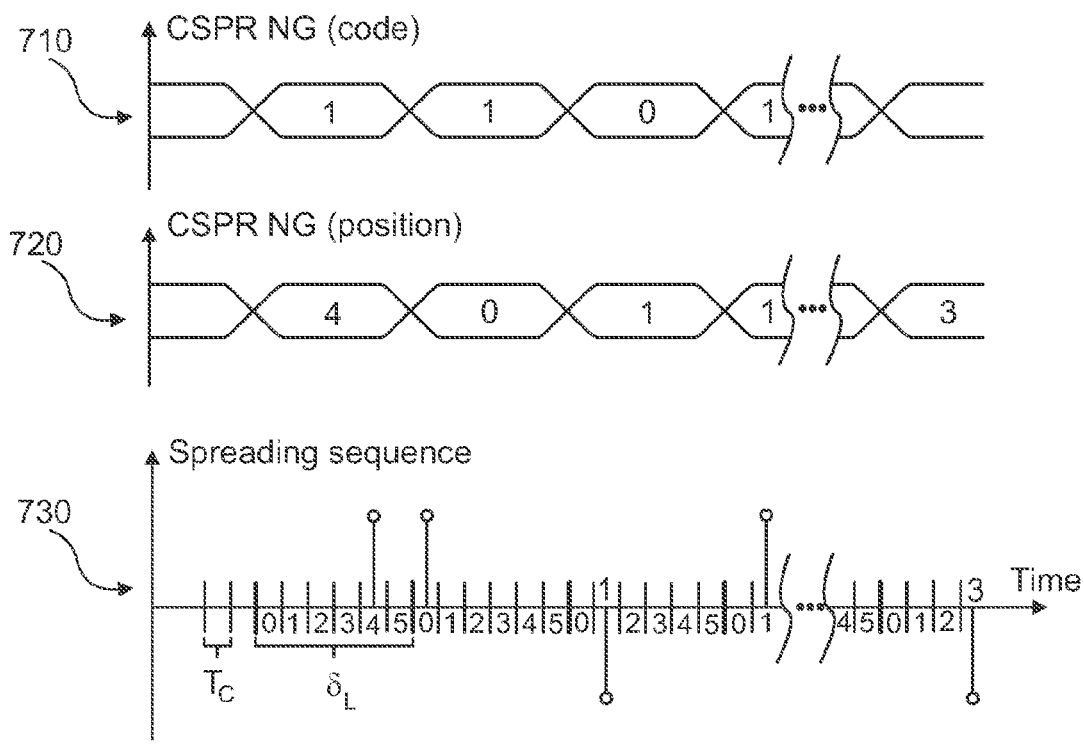

An example of code and time-hopping position generation suitable for IR-UWB applications can be seen in FIG. 7. Varying time-hopping may be used for non-coherent receivers or for further mitigation of Cicada attacks in coherent receivers since then the PRF is not static within the sequence and an attacker is not able to continuously hit a non-zero tap of the spreading code. For the example illustrated in FIG. 5, the sequence detector and code generator component 535 would thus be arranged to generate a validation code pattern, such as illustrated at 710, and also a validation code position pattern, such as illustrated at 720 for performing cross-correlation with the validation sequence within the packet illustrated at 730. Thus, it is contemplated that the generated validation pattern may comprise a validation code pattern 710, a validation code position pattern 720 and/or a validation code interleaving sequence.

Figure 8:
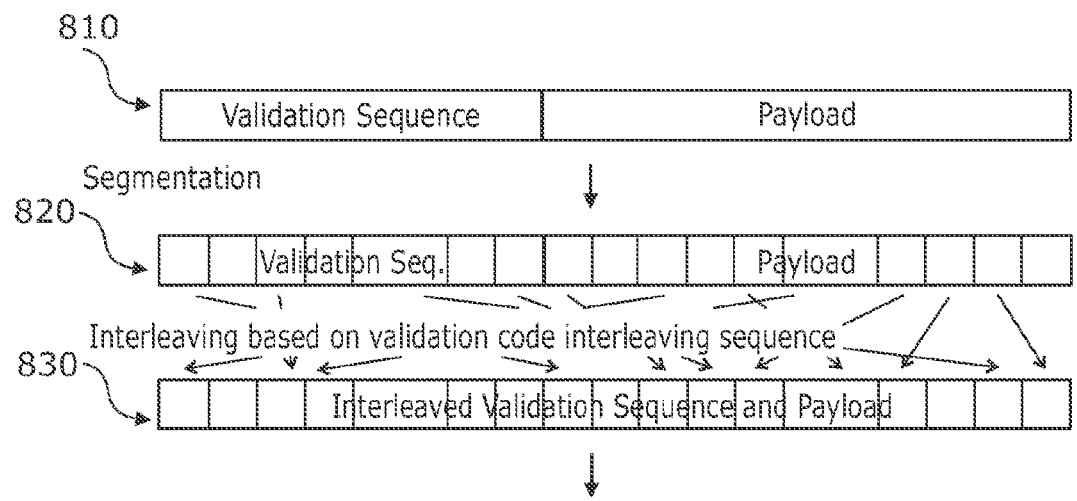

An example of a validation code interleaving sequence is illustrated in FIG. 8. The validation sequence and payload 810 are first segmented. Interleaving of the segmented validation sequence and payload 820 are is then performed to generated an interleave validation sequence and payload packet 830.

In addition to an ordinary Pseudo-Random Number Generator which focuses on statistical randomness, a CSPRNG provides additional properties to make it very difficult to predict future validation patterns by observation of the current and past validation sequences within packets or to determine the inner state of the validation pattern generator. Alternatively examples of algorithms that may be used to generate the validation pattern include, for example, hash functions etc. Thus it is contemplated that the validation pattern may be generated based on one or more of:
  a pseudo random number generator function;
  a cryptically secure pseudo random number generator function;
  a hash function; and
  a secure hash function.

Before a secure validation pattern can be employed, the legitimate transmitter and receiver devices need to agree on the specific validation pattern(s). This can either be done by transmitting the complete validation pattern(s) over a secure (encrypted) channel or by simply exchanging the reference value 532 for generating the validation pattern.

Figure 9:
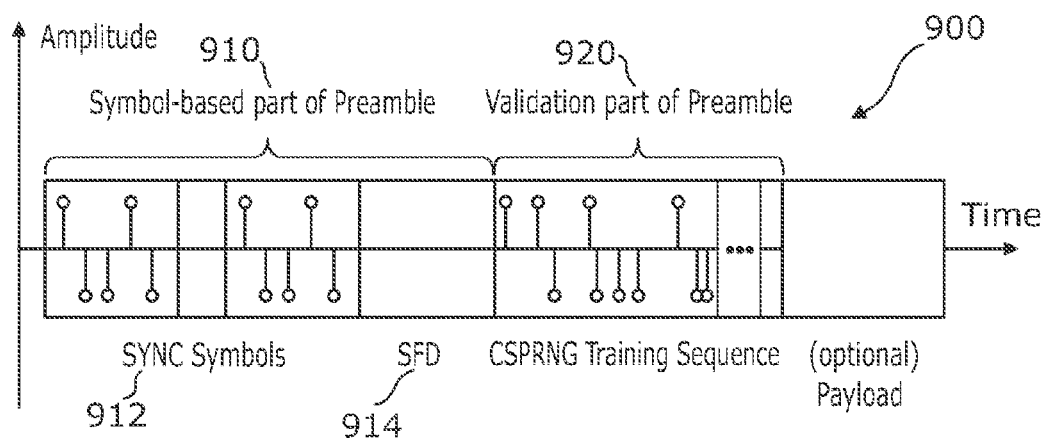
FIG. 9 illustrates an example of a packet structure.

FIG. 9 illustrates one example of a packet structure 900 according to some example examples. In the example illustrated in FIG. 9, a preamble of the packet 900 consists of a symbol-based section 910 followed by a validation section 920. For the example illustrated in FIG. 9, the symbol-based section 910 consists of a series of synchronisation symbols 912 followed by a Start of Frame Delimiter (SFD) 914. By providing the series of synchronisation symbols 912 at the start of the preamble in this manner, a receiver device is able to synchronise with an incoming packet, with the SFD 914 signalling the end of the series of synchronisation symbols 912. Furthermore, the series of synchronisation symbols 912 enable initial (unvalidated) channel estimate information to be generated for the packet. The validation section 920 of the preamble contains a validation sequence.

Referring back to FIG. 5, upon receipt of a packet 900 as illustrated in FIG. 9, the channel estimate generation component 410 is able to synchronise with the received signal 405 and to generate initial (unvalidated) channel estimate information 525 using the synchronisation symbols 912 within the first part of the preamble 910. A sequence detector and code generator component 535 of the validation component 530 is arranged to receive the validation pattern reference 532 for the packet being received and to generate a validation pattern based on the received validation pattern reference 532. The sequence detector and code generator component 535 is further arranged to detect when a validation sequence 920 within a packet is to be received, for example upon detection of the SFD 914 within the packet structure 900 illustrated in FIG. 9. The sequence detector and code generator component 535 may then cause cross-correlation to be performed between the validation sequence within the packet and the generated validation pattern to generate channel estimate validation information 555.

For the example illustrated in FIG. 5, the validation component 530 further comprises correlator circuits comprising multiplier components 540 and accumulator circuits 550. Each multiplier component 540 is arranged to receive the digital representation of the received RF signal 405 output by the ADC 330 and a correlation coefficient 537 output by the sequence detector and code generation component 535, perform cross-correlation of the received signal 405 and respective correlation coefficient 537 and to output a resulting correlation signal 545 to the respective accumulator circuit 550. The sequence detector and code generation component 535 is arranged to sequentially configure the correlation coefficient 537 output to each multiplier component 540 based on the generated validation pattern and on a delay of a multipath component of the transmission channel.

In the example illustrated in FIG. 5, the validation component 530 further comprises a tap selector 560 arranged to select one or more channel estimate taps to be validated, and provide an indication 565 of the selected taps to the sequence detector and code generation component 535. For example, and as illustrated in FIG. 5, the tap selector 560 receives the (unvalidated) tap values 525 output by the channel estimation component 500 and selects one or more channel estimate taps to be validated. For example, the tap selector 560 may select the first tap within the channel estimate for which the corresponding tap value 525 has a magnitude greater than a threshold, e.g. the first non-zero tap, such tap being indicative of a LoS path. The tap selector 560 may additionally/alternatively select one or more channel estimate taps having the highest magnitude value(s), etc. In the example illustrated in FIG. 5, the tap selector 560 is arranged to select two taps, for example a first non-zero tap within the channel estimate, and a tap having the highest magnitude tap value 525. The tap selector 560 provides an indication 565 of the selected taps to the sequence detector and code generator component 535. The sequence detector and code generator component 535 is then arranged to configure a delay for a first multiplier component 540 in accordance with the first selected tap, and to configure a delay for a second multiplier component 540 in accordance with the second selected tap. The sequence detector and code generator component 535 then sequentially configures the validation coefficients 537 for the multiplier components 540 based on the generated validation pattern and the respective delays configured therefor.

Figure 10:
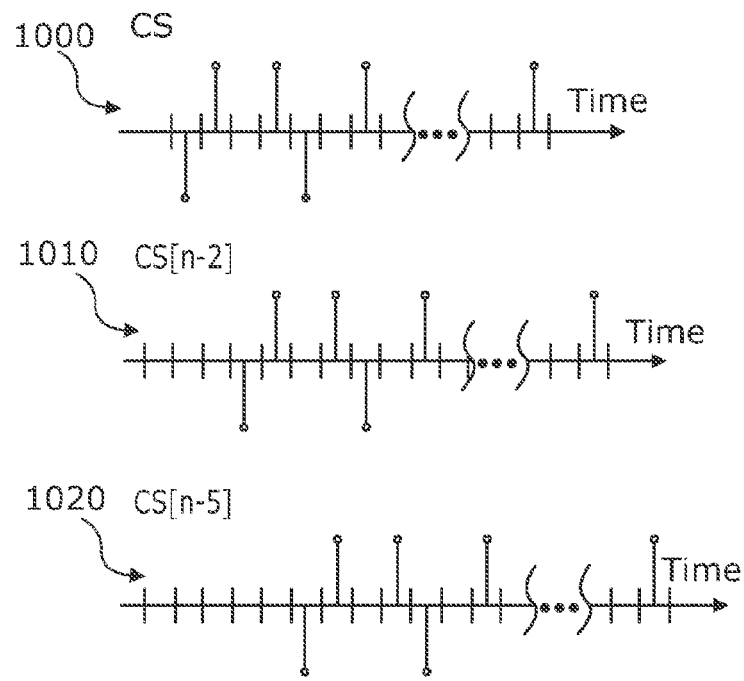
FIG. 10 illustrates a timing diagram showing an example of the sequential configuration of the validation coefficients.

FIG. 10 illustrates a timing diagram showing an example of the sequential configuration of the validation coefficients 537. An example of a part of a validation pattern generated by the sequence detector and code generator component 535 is illustrated at 1000. A first validation coefficient sequence is illustrated at 1010. This first validation coefficient sequence 1010 has been configured to follow the validation pattern 1000 but with a delay such that the timing of the validation pattern within the first validation coefficient sequence 1010 matches the timing of the validation sequence with the received signal 405 for the first selected channel estimate tap. Similarly, a second validation coefficient sequence is illustrated at 1020. This second coefficient sequence 1020 has been configured to follow the validation pattern 1000 but with a delay such that the timing of the validation pattern within the second validation coefficient sequence 1020 matches the timing of the validation sequence within the received signal 405 for the second selected channel estimate tap.

Referring back to FIG. 5, by configuring the validation coefficients 537 in this manner, the sequence detector and code generator component 535 is arranged to configure the multiplier components 540 to perform cross-correlation of the validation sequence within the received signal 405 and the generated validation pattern in relation to the selected channel estimate taps, and to output resulting correlation signals 545 for the selected channel estimate taps.

The correlation signal 545 output by each multiplier component 540 is fed to the validation accumulator circuit 550 within the respective correlator circuit. In this manner, each validation accumulator circuit 550 of the validation component is arranged to accumulate a validation pattern correlation value for the received signal 405 corresponding to a selected tap for the multipath transmission channel. The validation pattern correlation values accumulated by the validation accumulator circuits 550 thus provide the channel estimate validation information 555 for the selected taps.

Thus, for the example illustrated in FIG. 5, the validation component 530 is arranged to receive the unvalidated channel estimate information 525 output by the accumulator circuits 520 in relation to, for example, synchronisation symbols 912 within a first part 910 (FIG. 9) of the preamble of a received packet, select (by way of the tap selector 560) one or more tap(s) for which channel estimate validation information is to be generated, and perform cross-correlation (by way of the multiplier components 540 and accumulators 550) between the validation sequence 920 within the packet and the generated validation pattern 700 (FIG. 7) to generate channel estimate validation information 555 for the selected channel estimate tap(s).

The validation component 530 may further be arranged to determine whether the unvalidated channel estimate information 525 for the selected channel estimate tap(s) is valid based on the generated channel estimate validation information 555, and to output 575 an indication of whether the unvalidated channel estimate information 525 for the selected channel estimate tap(s) is valid based on said determination. For example, and as illustrated in FIG. 5, the channel estimate validation information 555 may be provided to a validator component 570. The validator component 570 may also be arranged to receive the unvalidated channel estimate information 525 and the indication 565 of the selected taps. The validator component 570 may then perform a comparison of the unvalidated channel estimate information 525 for each of the selected taps to the corresponding channel estimate validation information 555, and determine whether the unvalidated channel estimate information 525 for each of the selected taps is valid. Accordingly, the channel estimate information 415 (FIG. 4) provided to the timestamp module 420 may consist of the channel estimate information 525 consisting of the unvalidated channel estimate tap values and/or the indication 575 of whether the channel estimate information 525 consisting of the unvalidated channel estimate tap values for the selected channel estimate tap(s) is valid.

In some alternative examples, the validator component 570 may be arranged to replace unvalidated tap values 525 for the selected taps with validated tap values 555 for the selected taps output by the validation accumulator circuits 555, and to generate and output 575 validated channel estimate information consisting of the validated tap values 555 for the selected taps and unvalidated tap values 525 for non-selected taps.

The tap values 525 received by the tap selector 560 and based on which the tap selector 560 selects one or more taps may relate to, for example, preceding synchronisation symbols 912 with the same packet as the validation sequence for which cross-correlation is to be performed, as described above in relation to the packet 900 illustrated in FIG. 9. However, it is contemplated that in some example examples, the tap values 525 based on which the tap selector 560 selects one or more taps may relate may alternatively relate to a preceding packet within the received signal.

Figure 11:
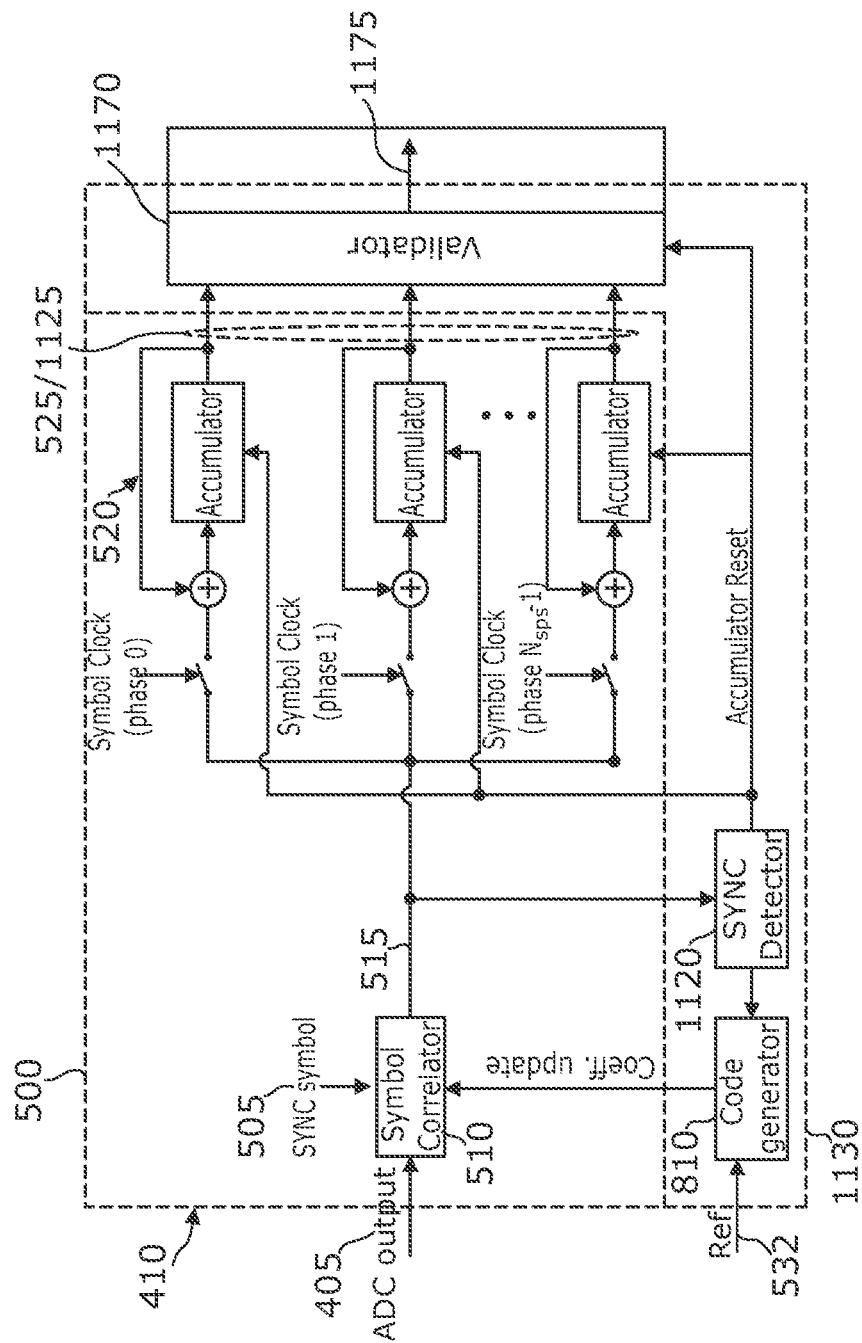
FIG. 11 illustrates a simplified block diagram of an alternative example of a channel estimate generation component.

FIG. 11 illustrates a simplified block diagram of an alternative example of the channel estimate generation component 410. For the example illustrated in FIG. 11, the channel estimate generation component 410 also comprises a channel estimation component 500. The channel estimation component 500 including a symbol correlator 510 arranged to receive the digital representation of the received RF signal 405 output by the ADC 330, and to perform cross-correlation of the received signal 405 with a reference pattern, for example a synchronisation symbol, and to output a resulting correlation signal 515. The correlation signal 515 output by the symbol correlator 510 is fed to a plurality of accumulator circuits, indicated generally at 520 via switches, the switches being controlled such that each accumulator circuit 520 is arranged to receive the correlation signal 515 output by the symbol correlator 510 at a specific phase within each successive correlation window. In this manner, each accumulator circuit 520 is arranged to accumulate a symbol correlation value h[i] for a received signal corresponding to a particular multipath component of the transmission channel, with the combined symbol correlation values h[0] to h[$N_{sps}$−1] forming channel estimate information 525/825 for the multipath transmission channel output by the channel estimation component 500, whereby each symbol correlation value h[i] comprises a channel estimate tap value within the channel estimate information 525/825 for the multipath transmission channel.

The channel estimate generation component 410 illustrated in FIG. 11 includes a validation component 1130. The validation component 1130 is arranged to receive a validation pattern reference 532 for a packet for which a ToA is to be determined, generate a validation pattern based at least partly on the validation pattern reference 532, identify a section within the packet comprising a validation sequence, and perform cross-correlation between at least a part of the validation sequence within the packet and at least a part of the generated validation pattern to generate validated channel estimate information. As for the example illustrated in FIG. 5, the validation pattern reference 532 may be in the form of a seed from which the validation pattern is derived, or in some alternative examples may comprise the validation pattern itself.

Upon receipt of a packet, for example comprising the packet 800 illustrated in FIG. 8, the symbol correlator 510 may initially be configured to perform cross-correlation of the received signal 405 with a reference pattern consisting of the synchronisation symbol 505 within the first part of the packet preamble 810. In this manner, the channel estimation component 500 is able to synchronise with the received signal 405 and to initially generate (unvalidated) channel estimate information 525 using the synchronisation symbols 812 within the first part of the preamble 810.

For the example illustrated in FIG. 11, the validation component 1110 comprises a code generator component 1110 arranged to receive the validation pattern reference 532 for the packet being received and to generate a validation pattern based on the received validation pattern reference 532. A sequence detector component 1120 is arranged to detect when a validation sequence 820 within a packet being received, for example upon detection of the SFD 814 within the packet structure 800 illustrated in FIG. 8. The sequence detection component 1120 may then instruct the code generator component 1110 to reconfigure the correlation coefficients for the symbol correlator 510 to cause the symbol correlator 510 to perform cross-correlation between the validation sequence within the received packet and the generated validation pattern. The sequence detection component 1120 may also reset the accumulator circuits 520, or cause their respective adder units to be bypassed for an initial channel estimation period, upon detection of the validation sequence 820. In this manner, the channel estimate is reconfigured to generate validated channel estimate information 1125 based on the cross-correlation between the validation sequence within the packet and the generated validation pattern performed by the symbol correlator 510. The validated channel estimation information 1125 may then be output to the timestamping module 420.

In some examples, and as illustrated in FIG. 11, the validation component 1130 may further include a validator component 1170 arranged to receive the unvalidated and validated channel estimation information 1125 output by the channel estimation component 500. The validator component 1170 may then perform a comparison of the unvalidated channel estimate information 525 to the validated channel estimate information 1125, and determine whether the (initially) unvalidated channel estimate information 525 is valid. The validator component 1170 may then output to the timestamping module 420 an indication of whether the (initially) unvalidated channel estimate information 525 is valid, such an indication forming a part of the channel estimate information 415 (FIG. 4) provided to the timestamp module 420.

Figure 12:
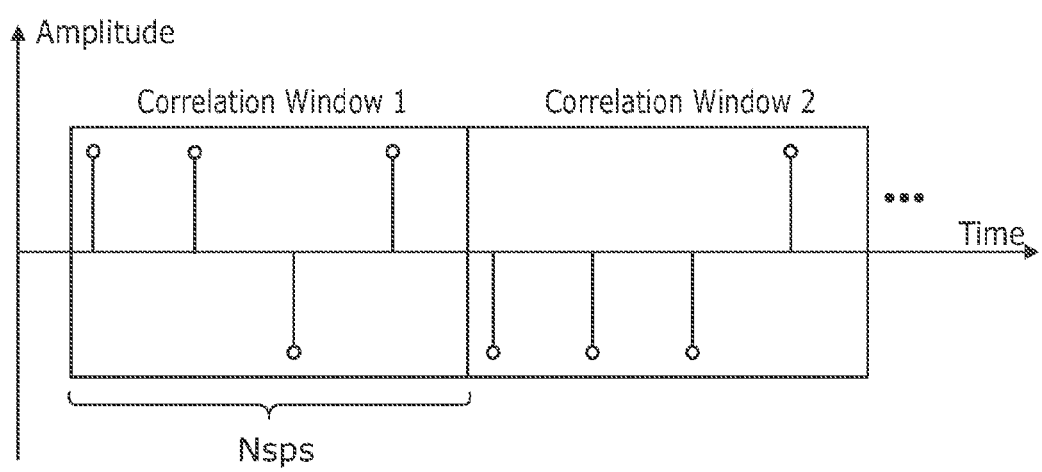
FIG. 12 illustrates an example of segmentation of a validation pattern.

In the example illustrated in FIG. 11, all channel estimate taps are validated with the coefficients of the symbol correlator 510 of the channel estimation component 500 being reconfigured every time a sample of the received packet has gone through all (Nsps) taps of the correlator delay line. If the validation pattern exceeds the correlation window for all (Nsps) taps of the correlator delay line, the validation pattern may be divided into correlation segments, with the length of each segment being the same as the correlation window for all (Nsps) taps of the correlator delay line, such as illustrated in FIG. 12.

Figure 13:
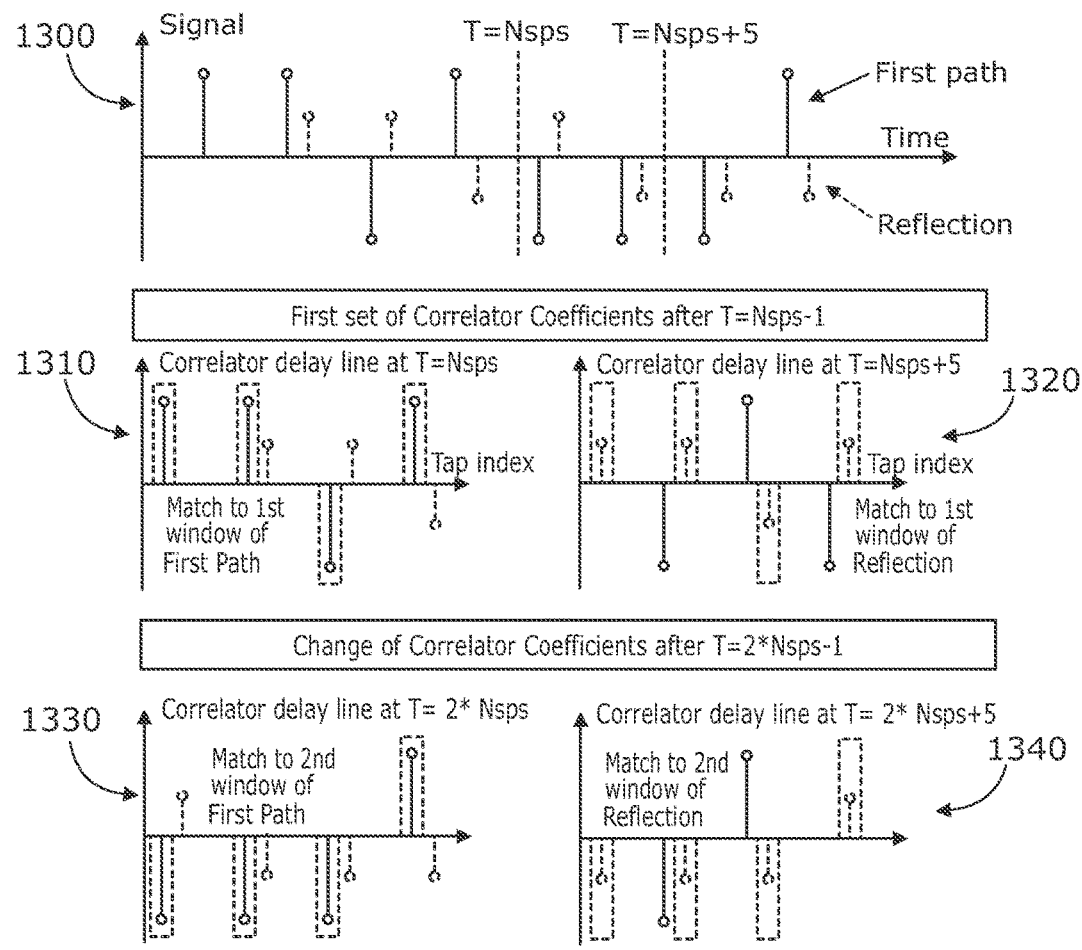
FIG. 13 illustrates an example of how symbol correlator coefficients may be reconfigured for a segmented validation pattern.

FIG. 13 illustrates an example of how the coefficients for the symbol correlator 510 may be reconfigured for such segmented validation pattern. The validation sequence within a first path and a second (reflection) path are illustrated at 1300, with the second path being received five samples later than the first path.

A first set of symbol correlator coefficients corresponding to a first correlation segment of the validation pattern configured for a correlator delay line of the symbol correlator 510 at T=$N_{sps}$, and for a correlator delay line at T=$N_{sps}$+5 are illustrated at 1310 and 1320 respectively. As illustrated in FIG. 13, a first part of the validation sequence within the first path matches the first correlation segment of the validation pattern configured for the correlator delay line at T=$N_{sps}$, 1310, whilst the first part of the validation sequence within the second path matches the first correlation segment of the validation pattern configured for the correlator delay line at T=$N_{sps}$+5 1320.

A second set of symbol correlator coefficients corresponding to a second correlation segment of the validation pattern configured for the correlator delay line of the symbol correlator 510 at T=2*$N_{sps}$, and for the correlator delay line at T=2*$N_{sps}$+5 are illustrated at 1330 and 1340 respectively. As illustrated in FIG. 13, a second part of the validation sequence within the first path matches the second correlation segment of the validation pattern configured for the correlator delay line at T=2*$N_{sps}$ 1330, whilst the second part of the validation sequence within the second path matches the second correlation segment of the validation pattern configured for the correlator delay line at T=2*$N_{sps}$+5 1340.

For the example illustrated in FIG. 11, initial (unvalidated) channel estimate information accumulated within the accumulator circuits 520 is lost when the accumulator circuits 520 are reset in order to accumulate validated channel estimate information from the validation sequence. For alternative examples it is contemplated that each accumulator circuit 520 may be provided with additional memory for storing both the initial (unvalidated) channel estimate and the subsequent (validated) channel estimate, or to split the memory originally used by the initial (unvalidated) channel estimate into two parts after the unvalidated channel estimate has been generated.

Advantageously, for each of the example examples hereinbefore described, protection is provided against cicada and (a)synchronous preamble injection attacks. This is achieved by using validation sequence(s) to derive the validated channel estimate information, whereby the validation sequences are resilient to the random pulses of cicada attacks, and prevent an attacker from synchronising to the legitimate signal and transmitting repetitive preamble symbols.

The resulting, validated channel estimate information for the validation sequence(s) may either be used as a stand-alone result or in addition it can be used to validate channel estimate information which was generated by the known synchronization sequence up-front. In this manner, attacks may not only be mitigated, but also be detected. To reduce hardware effort further, the validation sequence(s) may only be used for validation of already determined channel estimate taps (especially the first path) of a known, non-secure (or insecure) synchronization sequence.

An example of a packet structure containing a validation sequence has been illustrated in, and hereinbefore described in relation to, FIG. 8. In this particular example, the validation sequence 820 is provided after the synchronisation symbols 812 within the preamble 810 of the packet.

Figure 14:
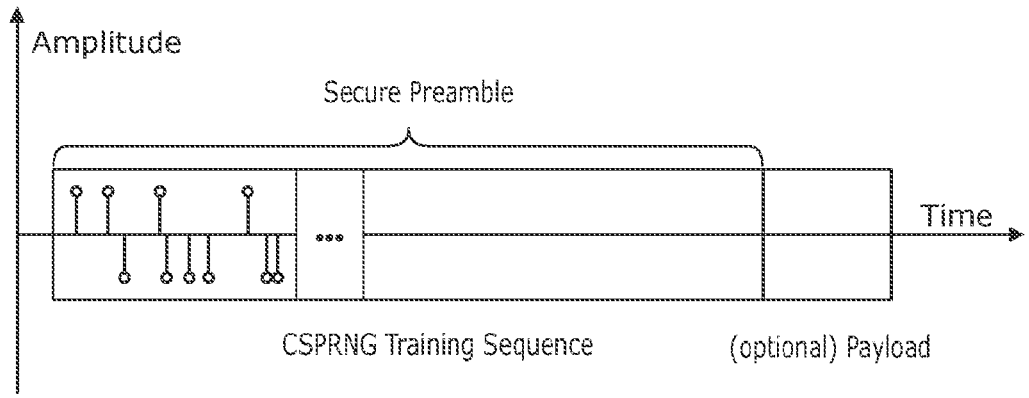
FIG. 14 illustrates an alternative example of a packet structure comprising a validation sequence.

FIG. 14 illustrates an alternative example of a packet structure comprising a validation sequence. In the example illustrated in FIG. 14, the validation sequence has been used to replace the preamble of the packet. Since the synchronization sequence from the preamble has been removed, synchronization either needs to be performed using the validation sequence or preceding packets. The lack of repeatable symbols within the validation sequence makes synchronization using the validation sequence difficult and may lead to either a reduced link budged or an increased hardware effort (e.g. longer correlation) in the receiver device. Thus in practice, a synchronization based on preceding, non-secure frames is preferred for such a packet structure. However, this would require accurate timing of the successive packets.

Figure 15:
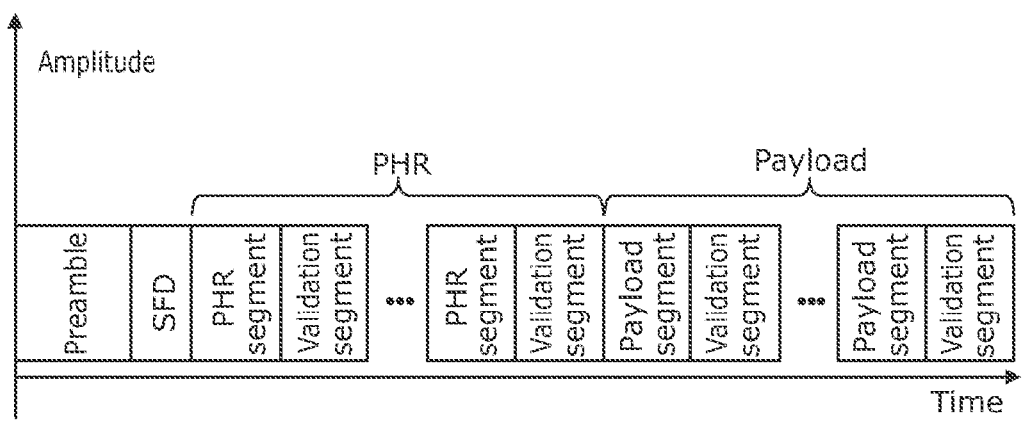
FIG. 15 illustrates a further alternative example of a packet structure comprising a validation sequence.

FIG. 15 illustrates a further alternative example of a packet structure comprising a validation sequence. In the example illustrated in FIG. 15, the validation sequence is time-multiplexed with the payload. In this manner, the validation sequence is distributed within time-multiplexed segments within the payload of the packet. Additionally/alternatively, the validation sequence may comprise segments interleaved with payload segments in accordance with a validation code interleaving sequence.

Referring back to FIG. 3, in the transmit direction the baseband processing module of the communication device 300 may be arranged to transmit a signal to a receiver device comprising a packet for which a ToA measurement is to be determined. Accordingly, the baseband processor module 340 may be arranged to derive a validation pattern for the packet for which a ToA measurement is to be determined, identify a section of the packet to contain a validation sequence, and generate the packet comprising the validation sequence corresponding to the derived validation pattern. In particular the baseband processor module 340 may be arranged to generate a packet comprising a validation sequence for use in generating channel estimate validation information has hereinbefore described in relation the receive direction of the baseband processor module 340.

Figure 16:
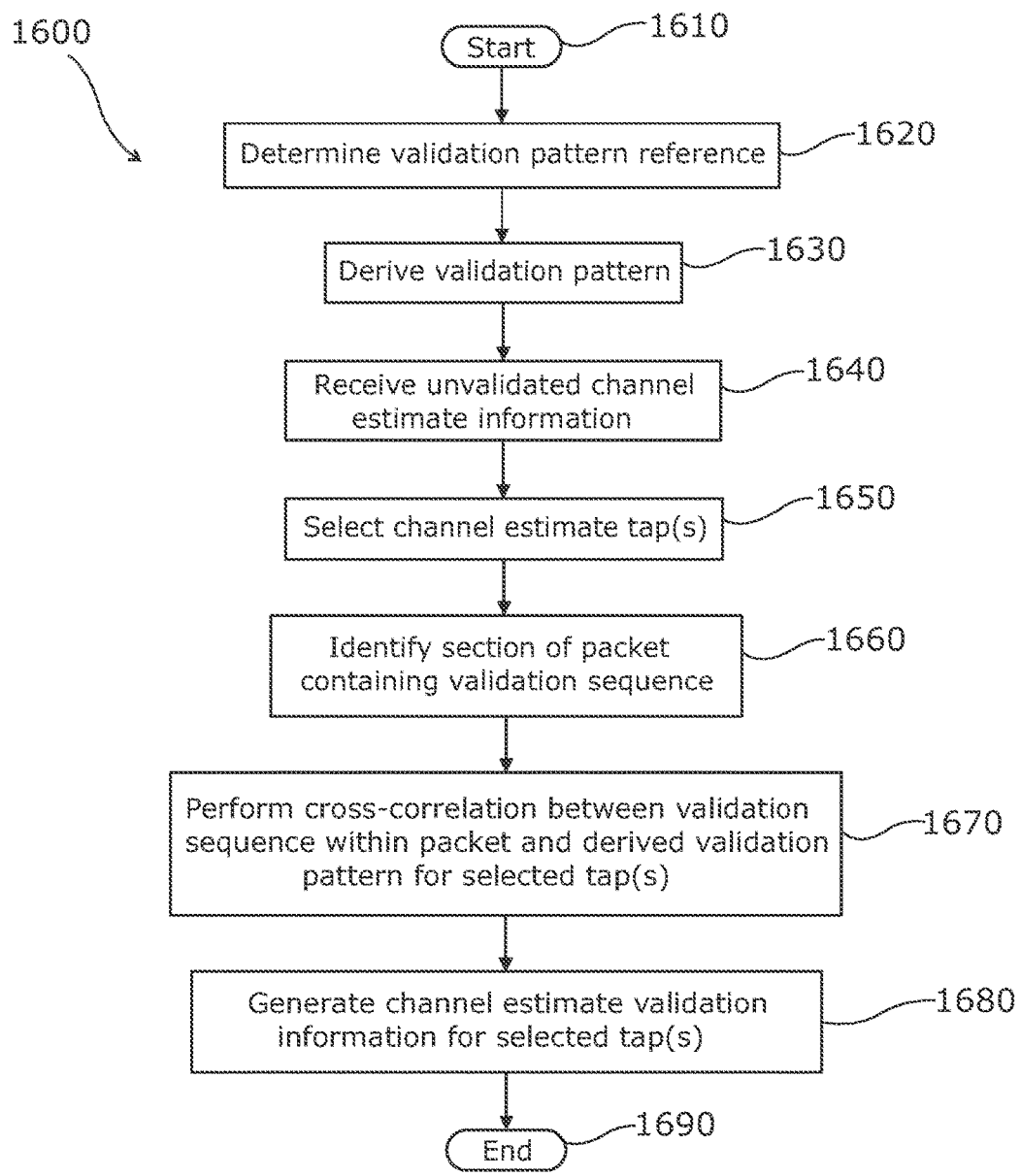
FIG. 16 illustrates a simplified flowchart of an example of a method of estimation of a propagation channel model.

Referring now to FIG. 16, there is illustrated a simplified flowchart 1600 of an example of a method of estimation of a propagation channel model within a communication receiver device for determining a Time-of-Arrival, ToA, measurement for a packet within a received signal, such as may be implemented within the channel estimate generation component 410 illustrated in FIG. 5. The method starts at 1610, and moves on to 1620 where a validation pattern reference is determined, for example by way of a challenge/response scheme between the legitimate transmitter and receiver devices. A validation pattern is then derived at 1630 based on the validation pattern reference. For example, the validation pattern reference may comprise a seed value and the validation pattern is generated by a CSPRNG using the validation pattern reference. Unvalidated channel estimate information for the transmission channel of a received packet is then received, at 1640, and one or more channel estimate taps are selected based on the received unvalidated channel estimate information, at 1650. A section of the received packet containing a validation sequence is identified at 1660, and cross-correlation between the validation sequence within the packet and the derived validation pattern is performed at 1670. Channel estimate validation information for the selected tap(s) is then generated at 1680 based on the performed cross-correlation. For example, the channel estimate validation information may be generated based on a comparison of the validated and unvalidated channel estimate information for the selected tap(s). The method then ends, at 1690.

Figure 17:
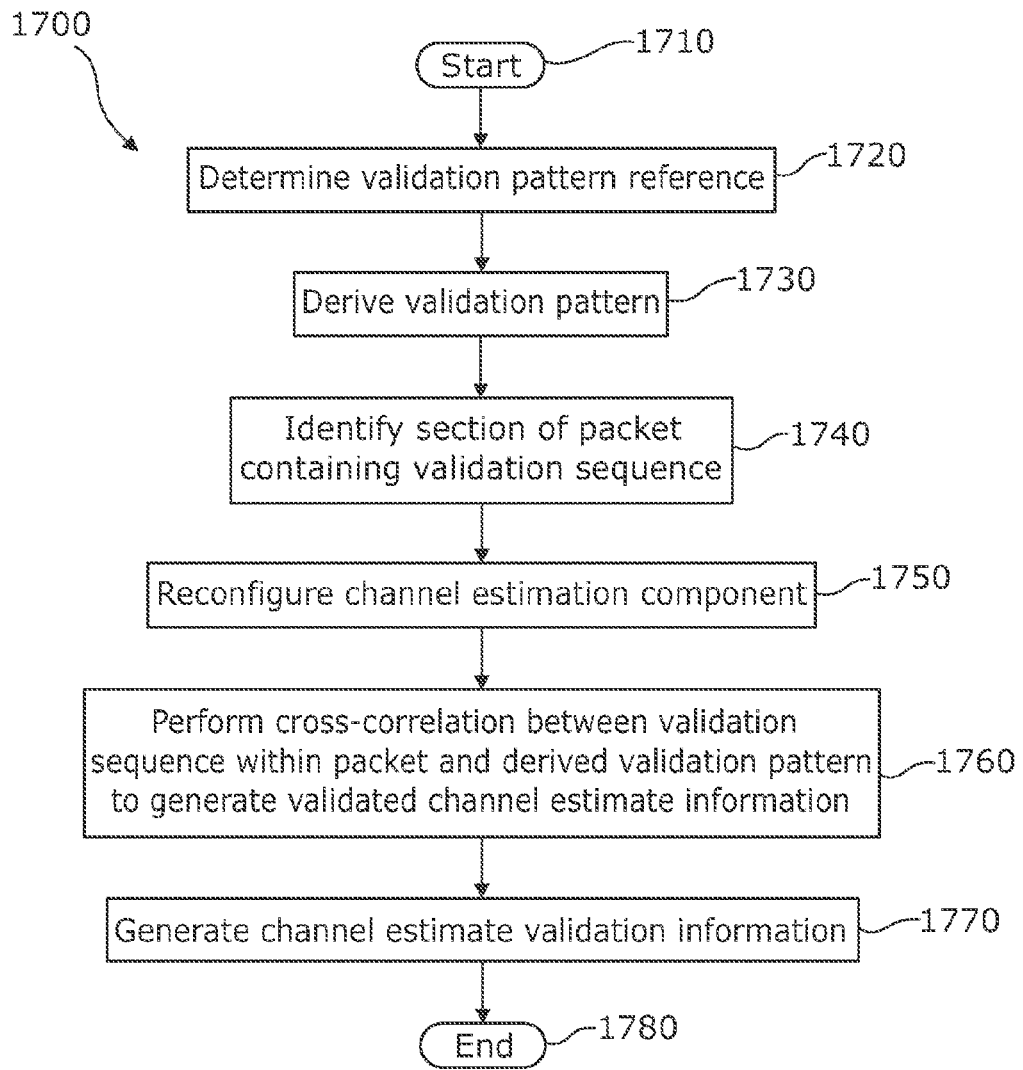
FIG. 17 illustrates a simplified flowchart of an alternative example of a method of estimation of a propagation channel model.

Referring now to FIG. 17, there is illustrated a simplified flowchart 1700 of an example of a method of estimation of a propagation channel model within a communication receiver device for determining a Time-of-Arrival, ToA, measurement for a packet within a received signal, such as may be implemented within the channel estimate generation component 410 illustrated in FIG. 11. The method starts at 1710, and moves on to 1720 where a validation pattern reference is determined, for example by way of a challenge/response scheme between the legitimate transmitter and receiver devices. A validation pattern is then derived at 1730 based on the validation pattern reference. For example, the validation pattern reference may comprise a seed value and the validation pattern is generated by a CSPRNG using the validation pattern reference. A section of a received packet containing a validation sequence is identified at 1740. A channel estimation component is then reconfigured to perform cross-correlation between the validation sequence within the received packet and the generated validation pattern, for example, and as illustrated in FIG. 11, by reconfiguring the correlation coefficients for a symbol correlator 510 of the channel estimation component 500. Cross-correlation between the validation sequence within the packet and the derived validation pattern is then performed at 1760, and validated channel estimate information is then generated at 1770 based on the performed cross-correlation. The method then ends, at 1780.

Figure 18A:
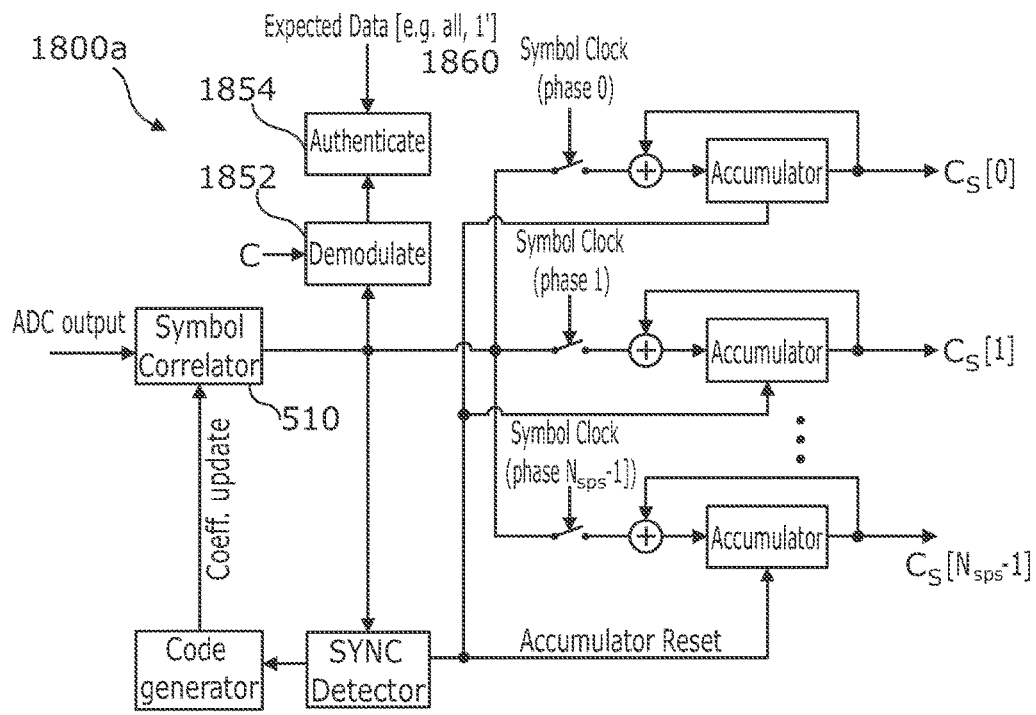
FIGS. 18a, 18b and 18c relate to simplified block diagrams of alternative examples of a channel estimate generation component plus authentication component.
Figure 18B:
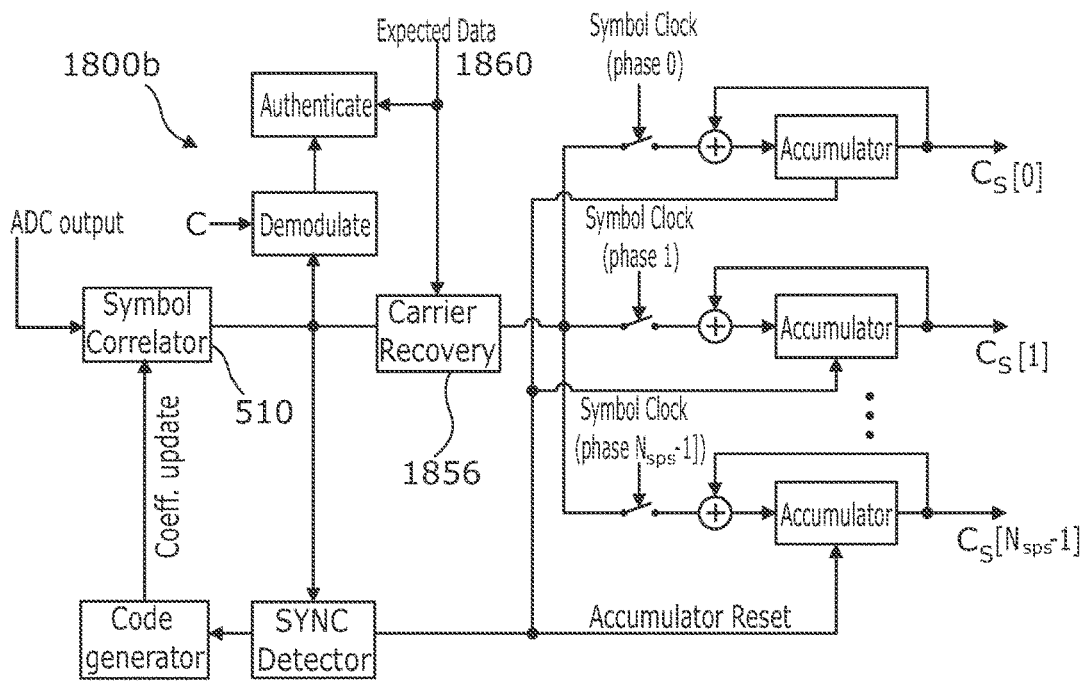

In the previously described examples, the secure training sequence is used to generate a secure channel estimate, which is then used to detect the first path to implement secure ranging. FIGS. 18a and 18b below provide examples in which the secure training sequence is used to authenticate the originator of the ranging frame, as well as to securely address the intended recipient.

FIG. 18a illustrates a channel estimate generation component 1800a that is similar to the channel estimate generation component previously described with reference to FIG. 11 and additionally provides for sender authentication.

A demodulator 1852 is provided to demodulate the secure training sequence in the output of the correlator 510 as if it were a payload. Knowledge of the channel impulse response as determined from the insecure channel response estimate may be used to receive and demodulate the secure training sequence.

An authentication unit 1854 authenticates the demodulated secure training sequence or part thereof. The authentication unit 1854 may compare the demodulated secure training sequence to expected data 1860, for example. In this case, the sender is authenticated, and the receiver may be addressed, if the demodulated secure training sequence matches the expected data 1860. The frame duration can be shortened because no additional authentication code or address has to be sent in the payload of the frame (see FIG. 9). The payload may therefore be omitted whilst retaining the ability to authenticate the sender. Reducing the frame length has the following two advantages. Firstly, it reduces the power consumption of the transmitter and receiver because less data is transferred. Secondly, it increases the link budget because for a reduced duration signal, transmission amplitude may be increased while maintaining average power. Regulations typically limit the average power per 1 ms period. The system subject to such regulation, a frame that is 0.5 ms long can hence be sent with 3 dB higher Tx power than a frame with a length ≥1 ms and hence has 3 dB more link budget.

At least some segments of the secure training sequence may be modulated with additional modulation such as phase shift keying (PSK) in order to securely address the intended recipient. PSK may be provided by binary phase shift keying (BPSK) or quadrature phase shift keying (QPSK)

FIG. 18b illustrates a channel estimate generation component 1800b that is similar to the channel estimate generation component previously described with reference to FIG. 18a and includes carrier recovery circuitry 1856 following the symbol correlator 510 in order to recover the carrier signal from the output of the symbol correlator 510 for accumulators. For basic challenge response schemes the channel estimate generation component 1800b can pre-calculate the expected data 1860 and undo the modulation before sending the output of the correlator 510 to the accumulators used for channel estimation (as described previously with reference to FIG. 11).

Figure 18C:
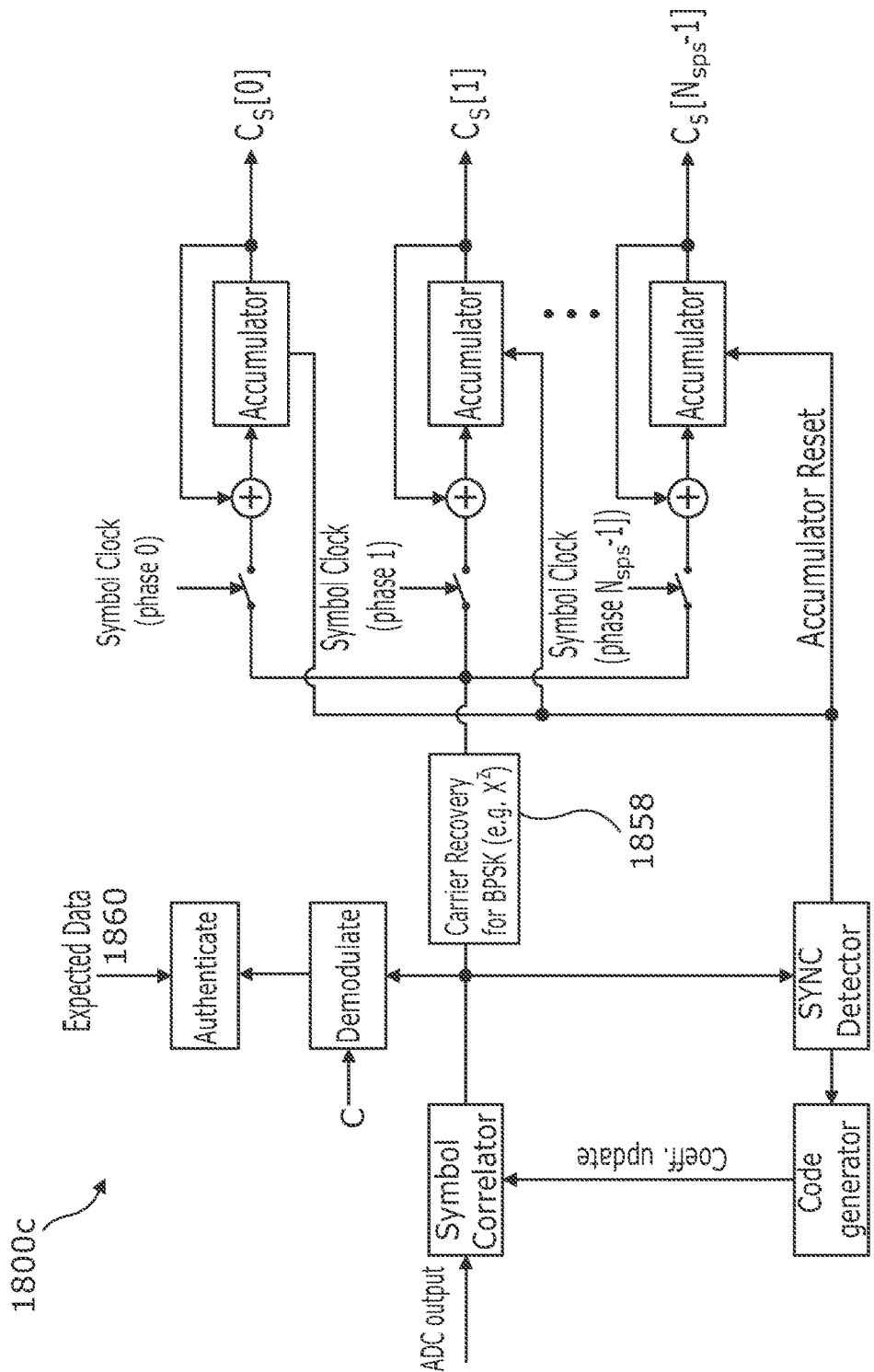

FIG. 18c illustrates a channel estimate generation component 1800c that is similar to the channel estimate generation component previously described with reference to FIG. 18b and suitable for implementing a scheme in which at least some segments of the secure training sequence are modulated with a scheme that allows carrier recovery (such as BPSK or QPSK). For such cases, carrier recovery circuitry 1858 can provide a carrier recovery scheme to undo the modulation and thus no expected data 1860 is required. The carrier recovery circuitry 1858 does therefore not take expected data 1860 as an input.

The approaches described with reference to FIGS. 18a and 18b have the following advantages:

1) In addition to a secure channel estimate, the receiver can use demodulation data for authentication 2) Since the authentication is already done with the secure training sequence, an additional payload can be omitted and thus the total frame length shortened to save time and power.

A problem encountered with some implementations of examples described with reference to the preceding figures relates to the detection of weak signals in the channel response. As described previously, in order to enable secure ranging that prevents an attacker from altering the measurement, the secure training sequence (validation sequence) and the corresponding validation pattern may be provided by a random or pseudorandom sequence. The auto-correlation property of such a validation pattern may be non-ideal in that significant side lobes, or secondary peaks, are present in a cross-correlation of the validation pattern and validation sequence.

Figure 1:
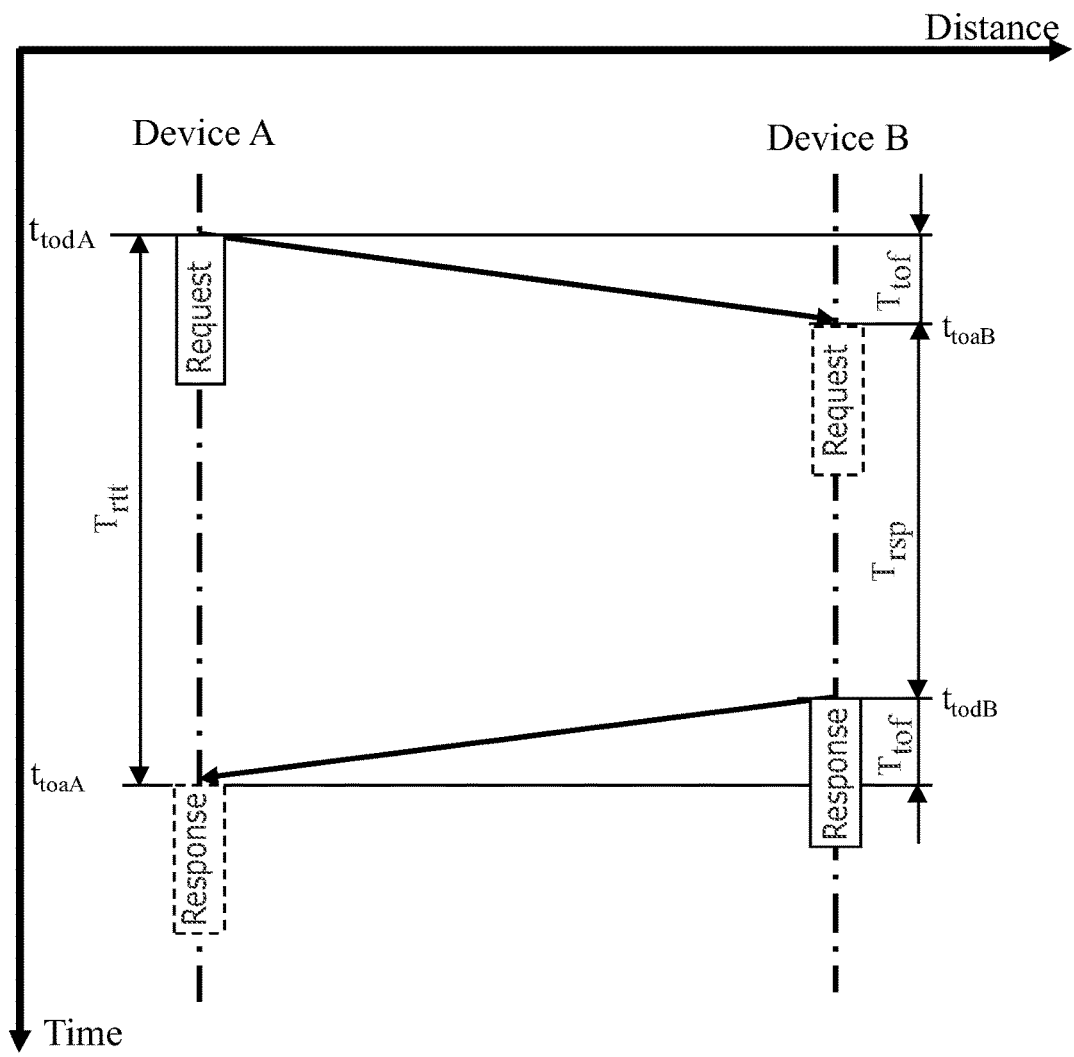
FIG. 1 illustrates the principle of calculating the ToF between two devices.
Figure 2:
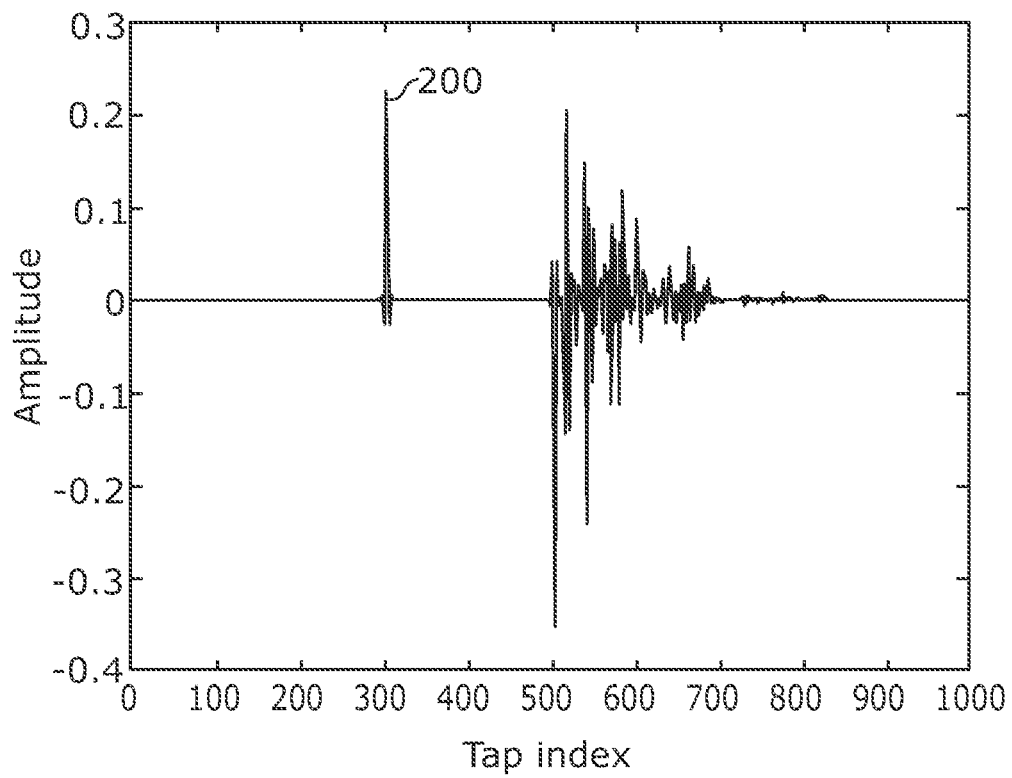
FIG. 2 illustrates an example of such a channel impulse response.
Figure 19:
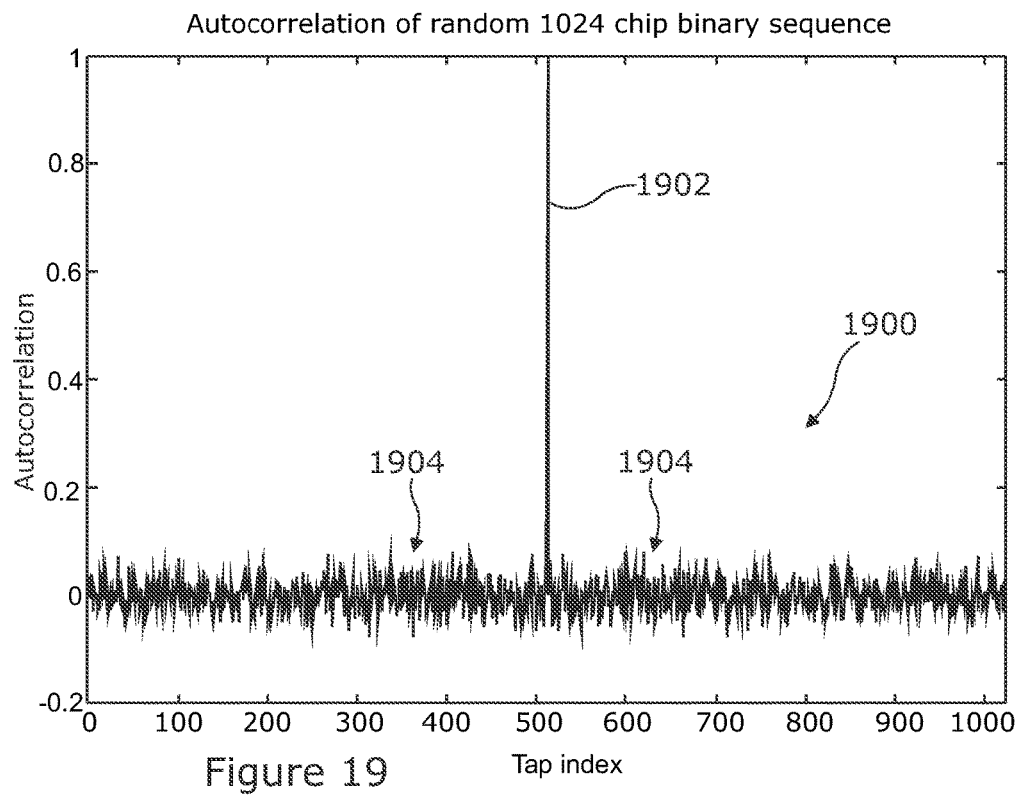
FIG. 19 illustrates an autocorrelation of a validation sequence.

FIG. 19 illustrates the auto-correlation 1900 of a 1024 chip binary random sequence that may be used as a validation pattern. The auto-correlation is illustrated as a function of tap index, which relates to the temporal dimension of the filter response. That is, the tap index is proportional to time and can be considered to be the same horizontal axis as the described previously for the channel impulse response (see FIG. 2, for example).

The auto-correlation 1900 has a central lobe 1902 at approximately tap index 500 and a plurality of side lobes 1904 on either side of the central lobe 1902. The central lobe 1902 has an auto-correlation property near unity (where the pattern exactly matches itself when there is no time difference applied between the two patterns) and is nonzero at the plurality of side lobes 1904 (where there is a temporal difference between the two correlated patterns). The nonzero side lobes 1904 limit sensitivity for detecting weak multi-path components in a relatively strong channel response.

Figure 20:
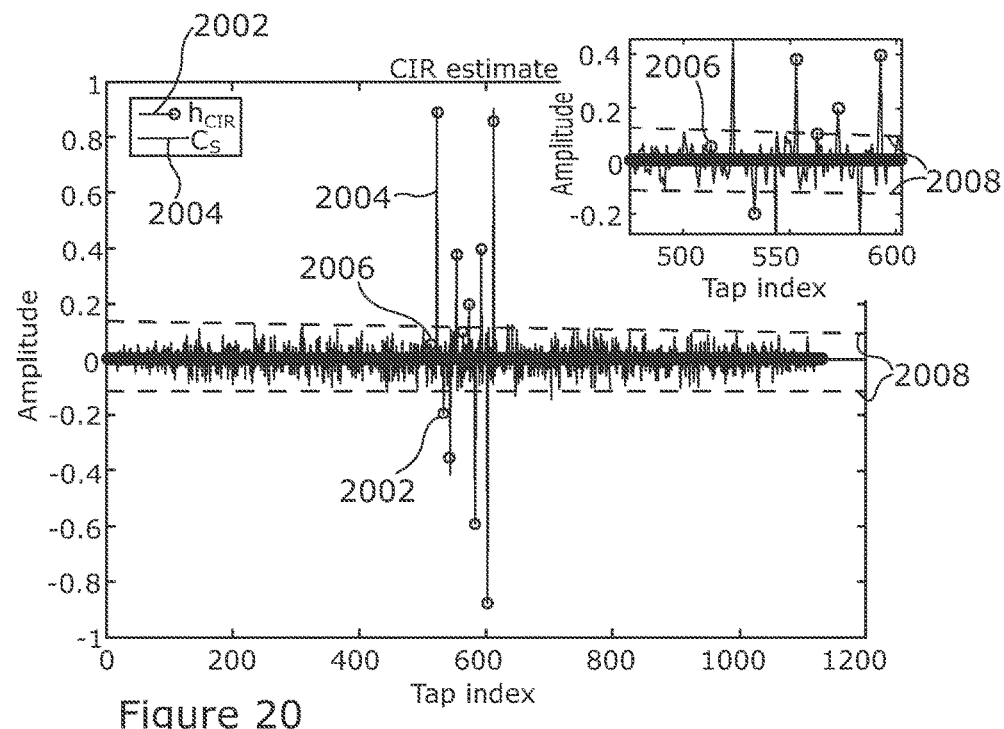
FIG. 20 illustrates an example of such a channel impulse response and associated estimate.

FIG. 20 illustrates an amplitude against tap index profile of and actual channel impulse response 2002 (which is unknown by the system and the object to be determined) presented with circles illustrating each data point and a secure channel impulse response 2004 presented with lines. The secure channel impulse response 2004 is derived by convolution of the channel impulse response 2002 with the auto-correlation of the validation sequence described previously with reference to FIG. 19. The cutaway of a particularly relevant portion of the profile is also provided (top right). A weak response 2006 at about tap 520 is hidden by interference from the side lobes present in the cross-correlation 2004 because the magnitude of the weak response 2006 is lower than a threshold 2008 defined by the amplitude of the side lobes of the auto-correlation of the validation sequence. The examples A to G described below with reference to FIGS. 21 to 43 enable the suppression of interference caused by the side lobes in the cross-correlation of a received validation sequence and a validation pattern, and therefore allow the detection of very weak multi-path components and maximize or increase the usable dynamic range between strong and weak multi-path components.

The following Mathematical symbols are used in the subsequent descriptions of FIGS. 21 to 42, which relate to examples in which non-ideal auto-correlation properties of the validation sequence are compensate for.

| Symbols | Note |
|---|---|
| ⊗ | Convolution |
| $P = [p_0, p_1, \ldots, p_{L-1}]$ $p_n \in \{-1, 0, +1\}$ | Standard preamble of length L sent by the transmitter, which is also known by the receiver. In the UWB context this is a periodic sequence drawn from a ternary alphabet and the average rate of non-zero pulses is fixed. |
| $P_{STX} = [p_{STX_0}, p_{STX_1}, \ldots, p_{STX_{K-1}}]$ $p_{STX_n} \in \{-1, 0, +1\}$ | Secure training sequence (derived validation sequence) of length K sent by the transmitter, which may also be derived independently by the receiver. In the UWB context this is a random sequence drawn from a ternary alphabet and the average rate of non-zero pulses is fixed. |
| $P_{SRX} = [p_{SRX_0}, p_{SRX_1}, \ldots, p_{SRX_{K-1}}]$ $p_{SRX_n} \in \{-1, 0, +1\}$ | Correlation pattern (validation pattern) to the secure training sequence used by the receiver. For examples A to F below, $P_{SRX}$ can be equal to $P_{SRX}$ |
| $CC_{STX} = [CC_{STX_0}, CC_{STX_1}, \ldots, CC_{STX_{2K-1}}]$ $CC_{STX_n} \in \mathbb{N}$ | Cross-correlation of the transmitted secure training sequence with itself (auto-correlation) |
| $CC_{SRX} = [CC_{SRX_0}, CC_{SRX_1}, \ldots, CC_{SRX_{2K-1}}]$ $CC_{SRX_n} \in \mathbb{N}$ | Cross-correlation of transmitted secure training sequence (as derived by the receiver) with the correlation pattern of the receiver (as derived by the receiver) |
| $CC_z = [CC_{z_0}, CC_{z_1}, \ldots, CC_{z_{2K-1}}]$ $CC_{z_n} \in \mathbb{N}$ | Cross-correlation result of the receiver with certain taps set to zero. |
| $h_{cir} = [h_{cir_0}, h_{cir_1}, \ldots, h_{cir_{K-1}}]$ $h_{cir_n} \in \mathbb{C}$ | Actual channel impulse response |

-continued

| Symbols | Note |
| --- | --- |
| $R = [r_0, r_1, \ldots, r_{L-1}]$ $r_n \in \mathbb{C}$ | Received signal of the standard preamble |
| $R_S = [r_{S_0}, r_{S_1}, \ldots, r_{S_{K-1}}]$ $r_{S_n} \in \mathbb{C}$ | Received signal of the secure training sequence (received validation sequence) |
| $C = [c_0, c_1, \ldots, c_{M-1}]$ $c_n \in \mathbb{C}$ | Insecure (unvalidated) channel estimate of length M. Channel impulse response is estimated in an insecure way, via the standard preamble ($C(n) = R(n) \otimes P(-n)$). |
| $C_Z = [c_{Z_0}, c_{Z_1}, \ldots, c_{Z_{M-1}}]$ $c_{Z_n} \in \mathbb{C}$ | Altered insecure channel estimate of length M. The insecure channel estimate is altered by zeroing the approximate region of the first path (e.g.: $C_Z = C$ ; $C_Z(U:V) = 0$). |
| $C_S = [c_{S_0}, c_{S_1}, \ldots, c_{S_{N-1}}]$ $c_{S_n} \in \mathbb{C}$ | Secure channel estimate of length N. Channel impulse response is estimated in a secure way, via the secure training sequence ($C_S(n) = R_S(n) \otimes P_{SRX}(-n)$). |

The channel estimation generation component 410 described previously with reference to FIG. 11 is suitable for implementing the methods described below with reference to examples A to H in such examples, the validator 1170 previously described with reference to FIG. 11 may be configured to provide a post processing module in order to provide for reduction in side lobes due to the non-ideal auto-correlation properties of the validation pattern.

During frame reception, the symbol correlator 505 of the channel estimation generation component 410 may perform the following steps for a signal of the type described previously with reference to FIG. 9:

1) Correlate the received RF signal 405 output by the ADC 330 for the standard preamble, R, against the preamble symbols, P, to generate an insecure (or unvalidated) channel impulse response estimate, C:

$$C(n) = R(n) \otimes P(-n)$$

2) Correlate the received signal, $R_S$, against the validation pattern, $P_{SRX}$, to generate a secure (or validated) channel estimate, $C_S$:

$$C_S(n) = R_S(n) \otimes P_{SRX}(-n)$$

3) Optionally, perform post processing to reduce the side-lobes in the secure channel estimate. Such post processing is described below with reference to examples A to F.

Example A additionally uses prior knowledge of an insecure estimate of the channel impulse response, C, and the secure training sequence, $P_{STX}$. The insecure channel impulse response estimate may be based on a channel impulse response of a standard preamble, P, of the data packet, which comprise a stream of repeated symbols to enable synchronization as described previously with reference to FIG. 9. The standard preamble, P, is typically designed to aid channel estimation, and has better (or even optimum) auto-correlation properties. The additional use of the insecure estimate of the channel impulse response, C, provides better, or even optimum auto-correlation properties compared to the stand alone result of a secure estimate of the channel impulse response, $C_S$, based on the received secure training sequence. The area of interest in the insecure channel impulse estimate (e.g. the area before the dominant channel taps) is zeroed. The expected correlator output with the zeroed taps is pre-calculated and subtracted from the actual correlator output for the secure training sequence. In this way, side lobes in the area of interest caused by channel responses outside the area of interest are removed. The result does now show the secure channel estimate in the area of interest. One implementation of example A is described below with reference to steps (a) to (e):

a. The cross-correlation of transmitted secure training sequence, $P_{STX}$, and the correlation pattern of the receiver, $P_{SRX}$, is calculated:

$$CC_{SRX}(n) = P_{STX}(n) \otimes P_{SRX}(-n)$$

The transmitted secure training sequence, $P_{STX}$, can be determined by the receiver in a similar way to the correlation pattern of the receiver, $P_{SRX}$. Indeed, in examples A-F described below, the transmitted secure training sequence, $P_{STX}$, may be the same as the correlation pattern of the receiver, $P_{SRX}$. The cross-correlation of the secure training sequence, $CC_{SRX}$, may therefore be pre-calculated by the receiver without the reception of a signal.

b. The insecure channel estimate is altered by zeroing the approximate region of the first path (e.g. the region from index U to index V):

$$C_Z = C; \ C_Z(U:V) = 0$$

Figure 21:
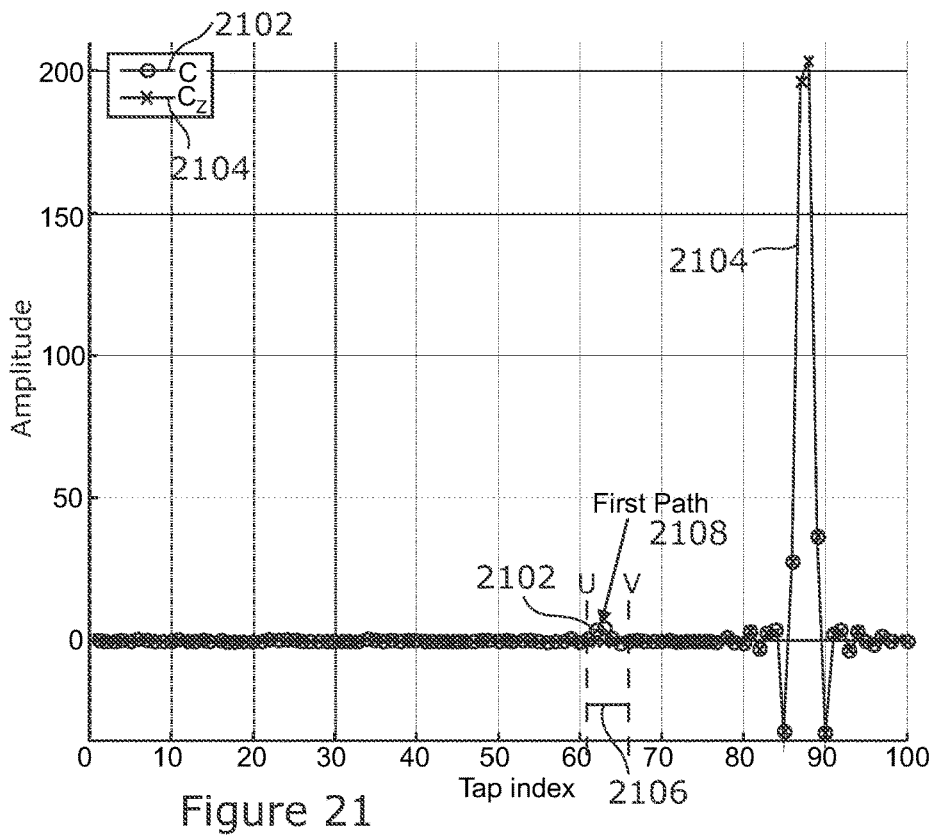
FIGS. 21 to 24 illustrate the non-validated channel estimate and the removal of expected multi-path components including the corresponding sidelobes for two examples (A and B) compensating for the effect of non-ideal autocorrelation properties of the validation sequence.

FIG. 21 illustrates an amplitude against tap index profile for an insecure channel estimate, C, 2102 and altered channel estimate, $C_Z$, 2104 with a zeroed first path region 2106. A detected weak first path 2108 is present at a tap index 62 for the insecure channel estimate, C.

c. The cross-correlation of the secure training sequence, $CC_{SRX}$, is convolved with the altered channel estimate, $C_Z$ to provide precursor channel estimate information, $C_A$:

$$C_A(n) = CC_{SRX}(n) \otimes C_Z(n)$$

d. Assessable channel estimate information, $C_D$, 2210 is derived by subtracting the precursor channel estimate information, $C_A$ from the secure channel estimate, $C_S$:

$$C_D = C_S - C_A$$

Figure 22:
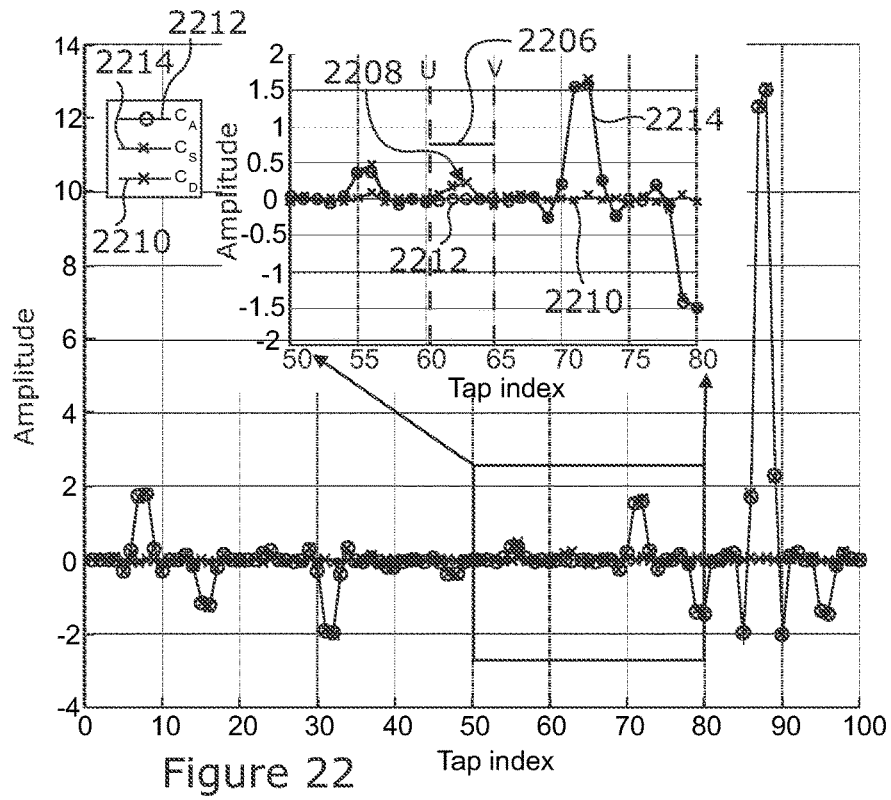

FIG. 22 illustrates an amplitude against tap index profile of the assessable channel estimate information, $C_D$, 2210 calculated from corresponding precursor channel estimate information, $C_A$, 2212 and secure channel estimate, $C_S$, 2214.

e. The assessable channel estimate information, $C_D$ is inspected at the altered region.

$$C_D(U:V)$$

Figure 23:
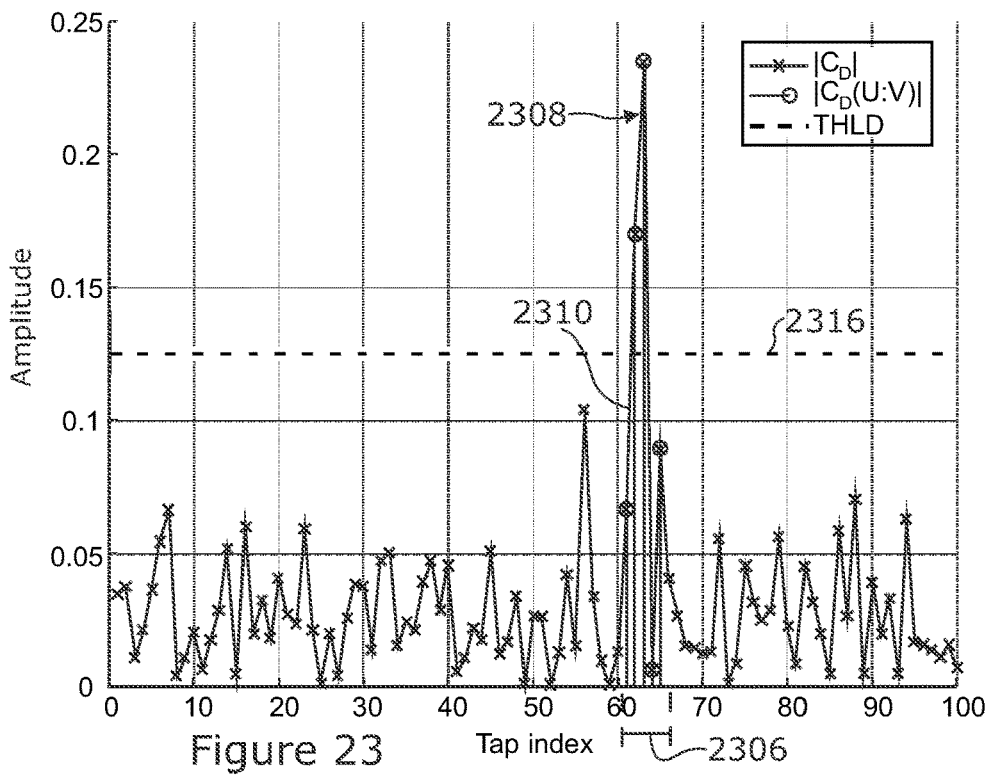

If the assessable channel estimate information, $C_D$, has an amplitude greater than a threshold level within the altered region then the presence of a valid signal path is confirmed. In FIG. 22, it can be seen that there is a peak 2208 in the assessable channel estimate information, $C_D$, 2210 in the region of interest 2206 and so the presence of a valid signal path is confirmed. FIG. 23 illustrates an amplitude against tap index profile for another example in which a peak 2308 in amplitude of assessable channel estimate information, $C_D$, 2310 is greater than a threshold 2316 within a region of interest 2306. It is therefore determined that a valid signal is present in the region of interest 2306.

Figure 24:
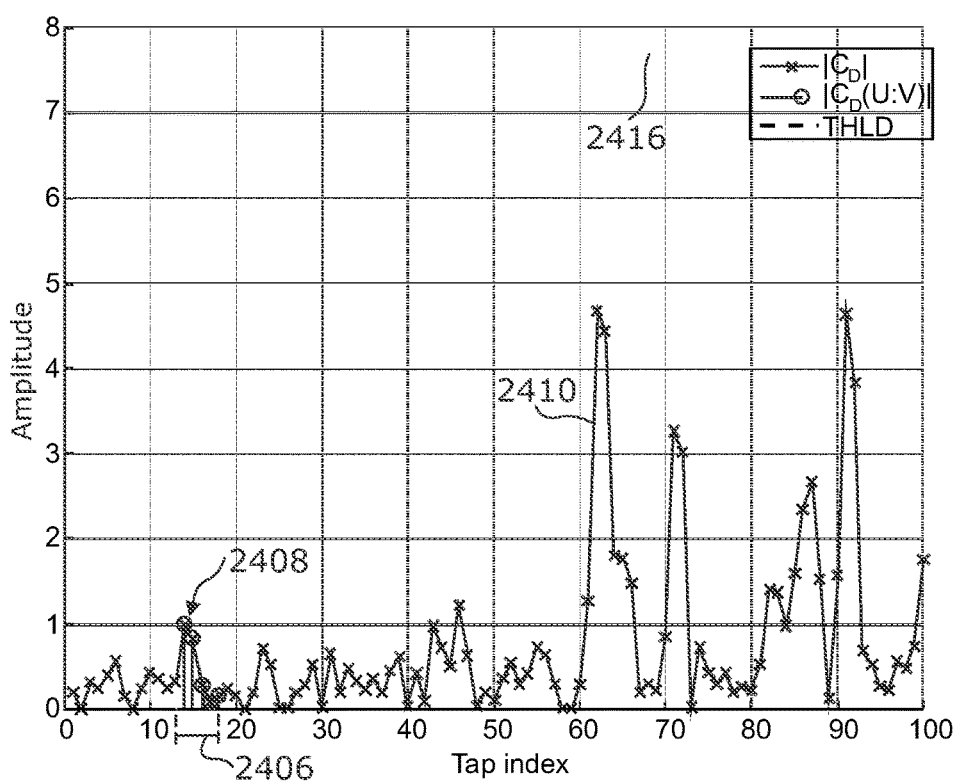

If the assessable channel estimate information, $C_D$, has an amplitude less than the threshold level within the altered region then the presence of a valid signal path cannot be confirmed. FIG. 24 illustrates an amplitude against tap index profile for an example in which a peak 2408 in amplitude of assessable channel estimate information, $C_D$, 2410 is less than a threshold 2416 within a region of interest 2406. It is therefore determined that the signal present in the insecure channel estimate (which determined the region of interest) is not a valid signal and may be due to an attack on the system, for example.

Figure 26:
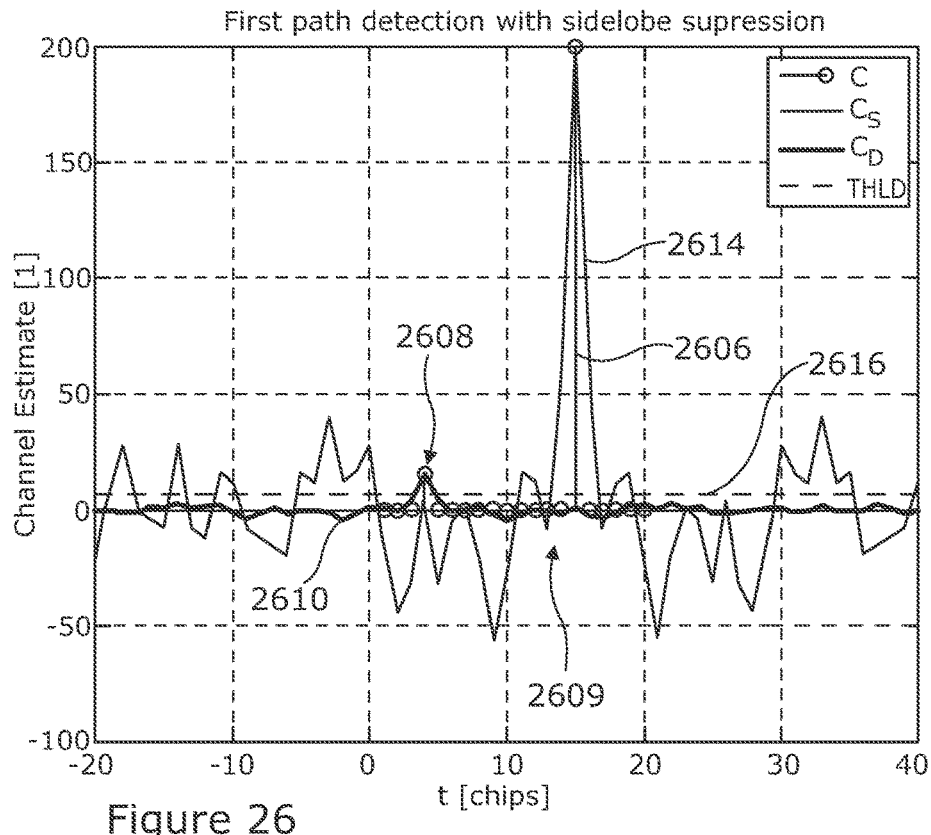
FIG. 26 shows an amplitude against time (which is proportional to the tap index) for various channel response profiles.

FIG. 26 shows an amplitude against time (which is proportional to the tap index) for various channel response profiles including an insecure channel estimate, C, 2606 generated from the standard preamble a corresponding secure channel estimate, $C_S$, 2614, and associated assessable channel estimate information, $C_D$, 2610. The actual channel estimate 2606 represents a two tap channel with a weak first path 2608 and a dominant second path 2609. Side lobes of the corresponding secure channel estimate, $C_S$, 2614 are higher than the first path 2608 and the targeted detection threshold, THLD, 2616. The first path 2608 is therefore too weak to be estimated directly using the secure channel estimate, $C_S$, 2614. However, by calculating the assessable channel estimate information, $C_D$, 2610, the weak first path 2608 is detectable because the amplitude of the assessable channel estimate information, $C_D$, 2610 at the first path 2608 is higher than the residual side lobes and the targeted detection threshold, THLD, 2616. The side-lobe suppression algorithm of example A therefore allows the precise estimation of position and amplitude of the first path 2608.

Example B uses prior knowledge of the insecure channel estimate, C, of the impulse response and the secure training sequence, $P_{STX}$. The procedure is similar to example A but no multi-path components are zeroed from the insecure channel estimate, C. An expected correlator output is pre-calculated and subtracted from the actual correlator output. If the result is random noise (i.e. no value exceeds the detection threshold), then all paths detected in the insecure channel estimate, C, are genuine and the ranging measurement can be accepted as valid. That is, in example B, validation is achieved by removing from the secure channel estimate all expected path components from the insecure channel estimate. One implementation of example B is described below with reference to steps (a) to (d):

a. The cross-correlation, $CC_{SRX}$, of transmitted secure training sequence, $P_{STX}$, and the correlation pattern of the receiver, $P_{SRX}$ is calculated:

$$CC_{SRX}(n) = P_{STX}(n) \otimes P_{SRX}(-n)$$

b. The cross-correlation of the secure training sequence, $CC_{SRX}$, is convolved against the insecure channel estimate, C, to provide precursor channel estimate information, $C_B$:

$$C_B(n) = CC_{SRX}(n) \otimes C(n)$$

c. Assessable channel estimate information, $C_D$, 2206 is derived by subtracting the precursor channel estimate information, $C_B$, from the secure channel estimate, $C_S$:

$$C_D = C_S - C_B$$

d. The assessable channel estimate information, $C_D$ is inspected. If the assessable channel estimate information, $C_D$, has an amplitude less than a threshold level within the region of interest then the presence of a valid signal path is confirmed.

Figure 25A:
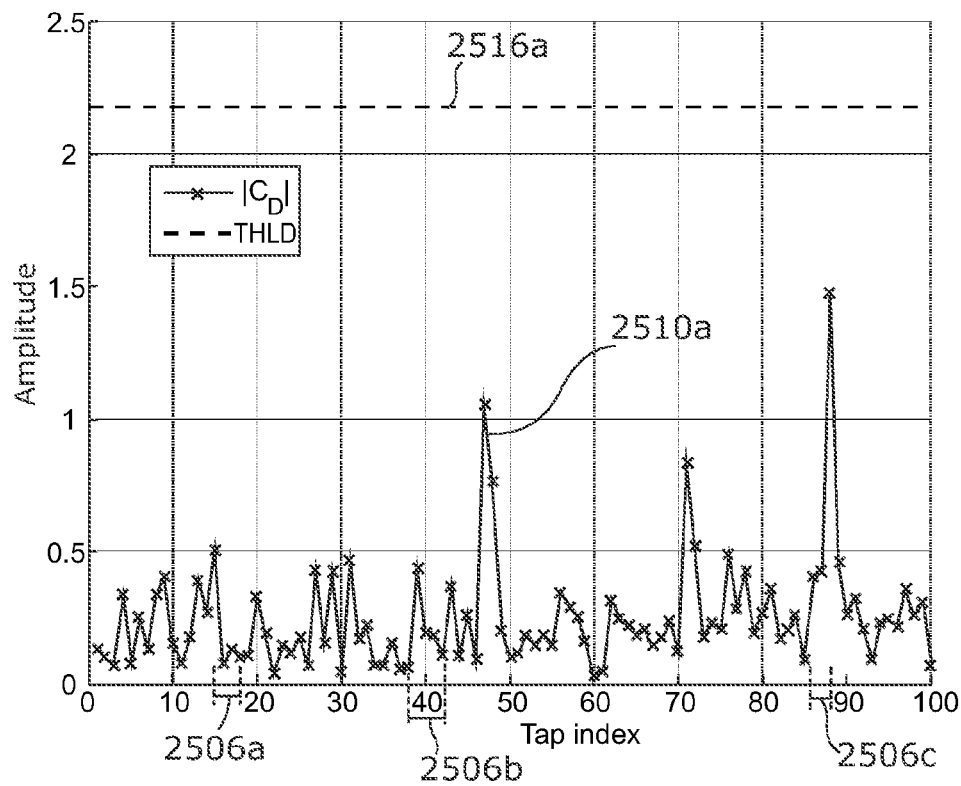
FIGS. 25a and 25b illustrate the residual estimate after all expected multi-path components and corresponding sidelobes have been removed based on the non-validated channel estimate.

FIG. 25a illustrates an amplitude against tap index profile for an example in which assessable channel estimate information, $C_D$, 2510a is less than a threshold 2516a within three regions of interest 2506a, 2506b, 2506c. It is therefore determined that valid signals are present in the regions of interest 2506a, 2506b, 2506c.

Figure 25B:
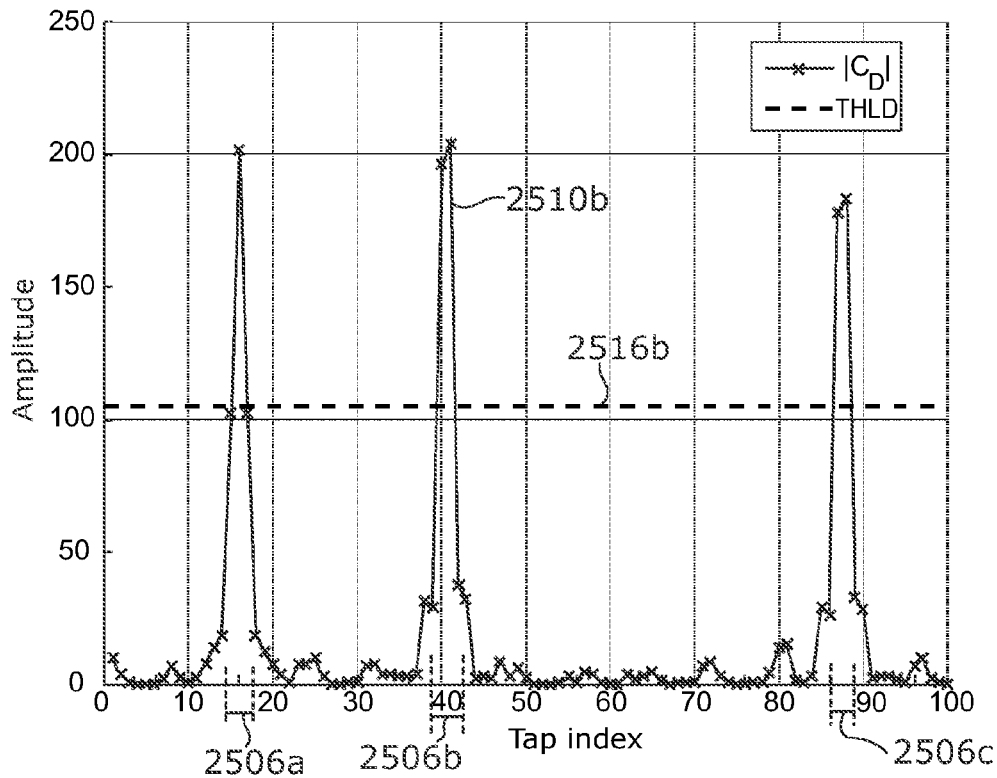

FIG. 25b illustrates an amplitude against tap index profile for an example in which assessable channel estimate information, $C_D$, 2510b is greater than a threshold 2516b within a region of interest 2506b. It is therefore determined that the signal present in the insecure channel estimate (which determined the regions of interest 2506a, 2506b, 2506c) is not a valid signal and may be due to an attack on the system, for example.

Example C uses prior knowledge of the insecure channel impulse response, C, and the secure training sequence $P_{SRX}$. The main lobe of cross-correlation result of the correlation pattern, $P_{SRX}$, (validation pattern) and the secure training sequence, $P_{STX}$, (validation sequence) is set to zero, so that only the side-lobes remain. This result is then convolved with the known, insecure channel impulse response to calculate the expected cross-correlation contribution of the channel caused only by the side-lobes. The expected side-lobe contribution is then subtracted from the actual received correlator output determined for the secure training sequence. One implementation of example C is described below with reference to steps (a) to (d):

a. The cross-correlation of transmitted secure training sequence, $P_{STX}$, and the correlation pattern of the receiver, $P_{SRX}$ is calculated to provide a first cross-correlation function, $CC_{SRX}$:

$$CC_{SRX}(n) = P_{STX}(n) \otimes P_{SRX}(-n)$$

Figure 27:
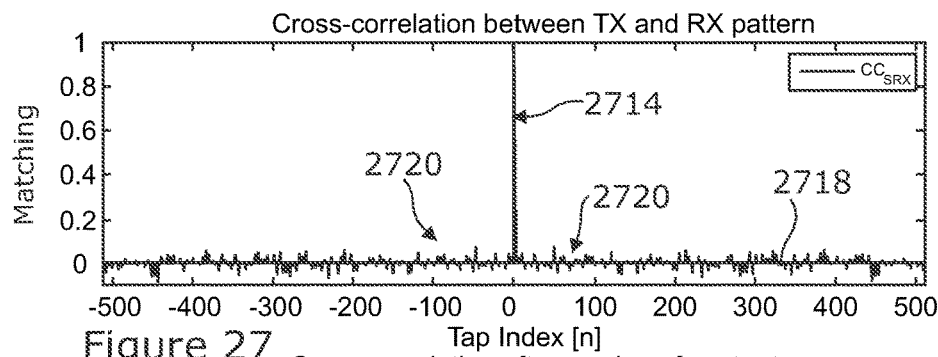
FIGS. 27 to 30 illustrate the effect of modifying the result of a cross-correlation of a validation pattern and a validation sequence in a third example (C) compensating for the effect of non-ideal autocorrelation properties of the validation sequence.

FIG. 27 illustrates a relative amplitude against tap index profile for first cross-correlation function, $CC_{SRX}$, 2718. The first cross-correlation function, $CC_{SRX}$, 2718 has a dominant, main lobe 2714 and a plurality of side lobes 2720.

b. The amplitude of the main lobe of the first cross-correlation function, $CC_{SRX}$, is set to zero to provide modified cross-correlation function, $CC_Z$:

$$CC_Z = CC_{SRX}; \quad CC_Z(n=0) = 0$$

Figure 28:
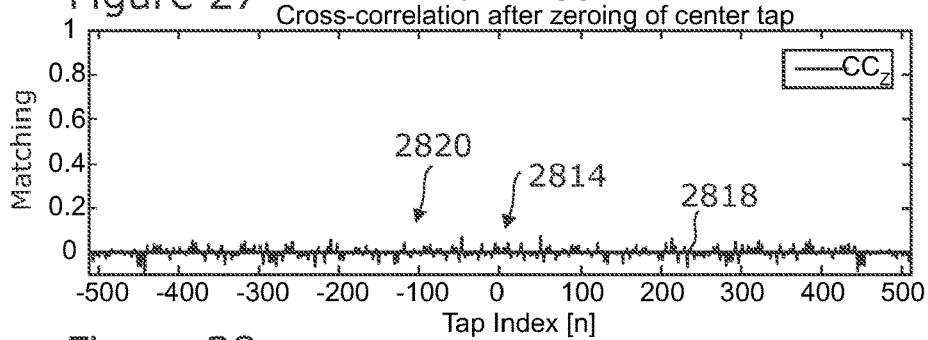

FIG. 28 illustrates a relative amplitude against tap index profile of modified cross-correlation function, $CC_Z$, 2818 based on the first cross-correlation function, $CC_{SRX}$, of FIG. 27. The modified cross-correlation function, $CC_Z$, 2818 has a plurality of side lobes 2820 but no main lobe 2814.

c. The modified cross-correlation function, $CC_Z$ is convolved with the insecure channel estimate, C, to provide the expected cross-correlation side-lobe contribution in the secure channel estimate, defined as an intermediate or equalization estimate, $EQ_C$:

$$EQ_C(n) = CC_Z(n) \otimes C(n)$$

Figure 29:
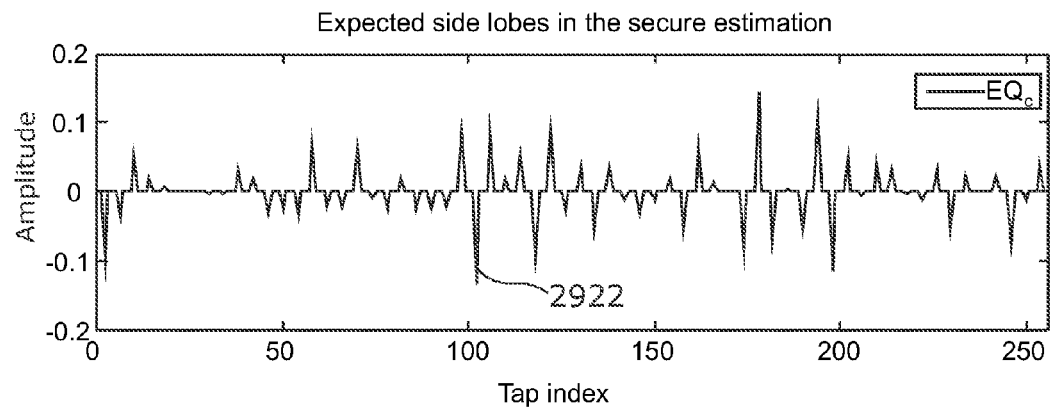

FIG. 29 illustrates an amplitude against tap index profile for the equalization estimate, $EQ_C$, 2922 calculated based on the modified cross-correlation function, $CC_Z$, of FIG. 28 and the insecure channel estimate, C.

d. Assessable channel estimate information, $C_{FEQ}$, may be determined by subtracting the equalization estimate, $EQ_C$, from the secure channel estimate, $C_S$:

$$C_{FEQ} = C_S - EQ_C$$

Figure 30:
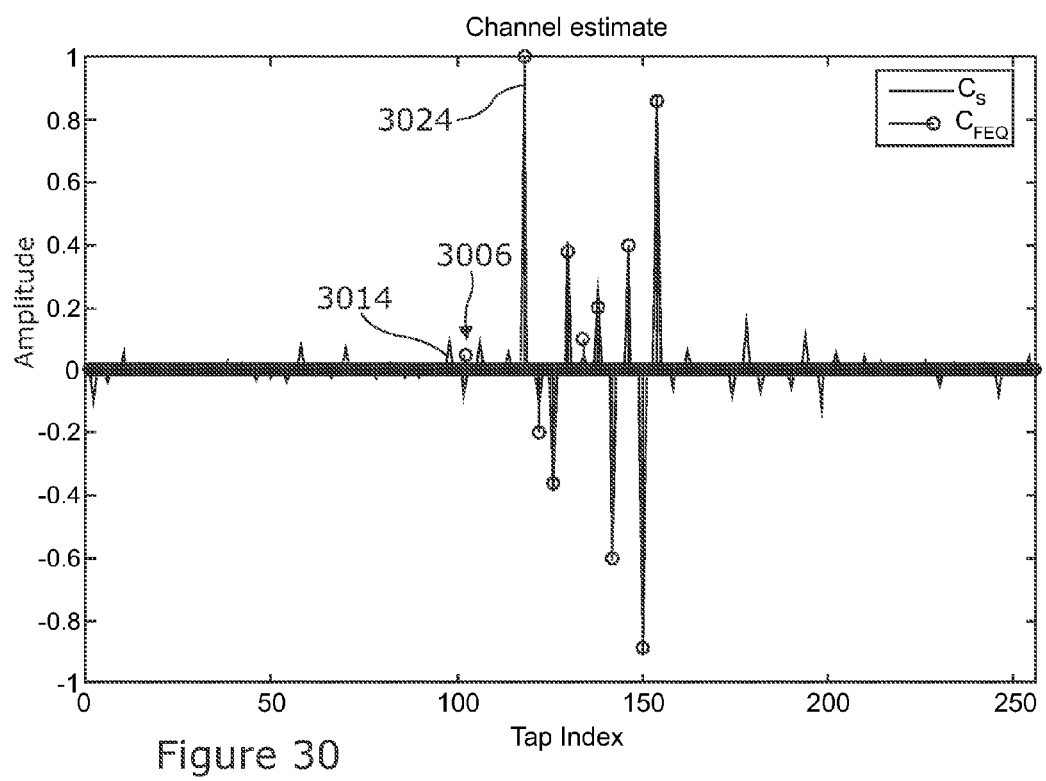

FIG. 30 illustrates amplitude against tap index profiles for a secure channel estimate 3014 and assessable channel estimate information, $C_{FEQ}$, 3024 calculated based on the equalization estimate, $EQ_C$, of FIG. 29 and the secure channel estimate, $C_S$, 3014. A weak first multipath component 3006 is identified by the assessable channel estimate information, $C_{FEQ}$, which is not discernable in the secure channel estimate, $C_S$, 3014. Example D is based on example C and sets the main lobe and all taps after the main lobe of the cross-correlation of transmitted secure training sequence and the correlation pattern of the receiver to zero. Which in the end compensates only the contribution of the side-lobes ahead of the main lobe. This is sufficient if we search only for the first path, because the search only proceeds in one direction and side-lobes later in time are not relevant for time of arrival (ToA) estimation. One implementation of example D is described below with reference to steps (a) to (d):

a. The cross-correlation of transmitted secure training sequence, $P_{STX}$, and the correlation pattern of the receiver, $P_{SRX}$ is calculated to provide the first cross-correlation function, $CC_{SRX}$:

$$CC_{SRX}(n) = P_{STX}(n) \otimes P_{SRX}(-n)$$

Figure 31:
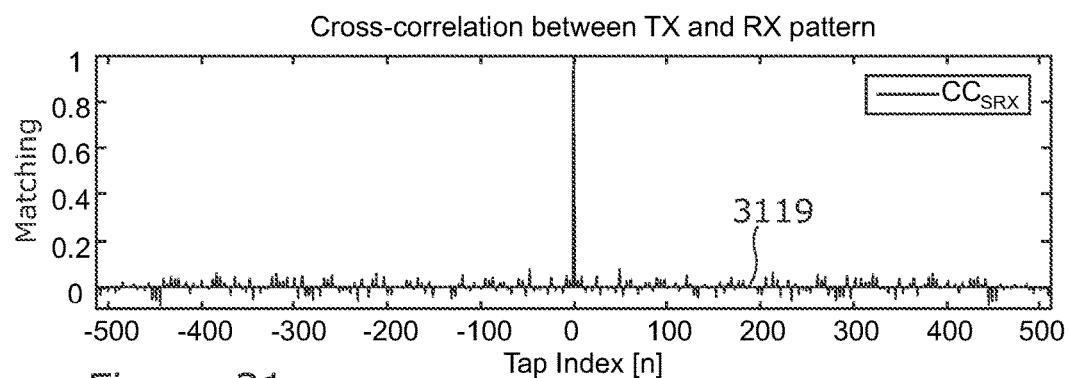
FIGS. 31 to 34 illustrate the effect of modifying the result of a cross-correlation of a validation pattern and a validation sequence in a fourth example (D) compensating for the effect of non-ideal autocorrelation properties of the validation sequence.

FIG. 31 illustrates the first cross-correlation function, $CC_{SRX}$, 3119 that was described previously with reference to FIG. 27 (regarding example C).

b. The amplitudes of the main lobe and all trailing taps of the first cross-correlation function, $CC_{SRX}$, are set to zero to provide modified cross-correlation function, $CC_Z$:

$$CC_Z = CC_{SRX}; \ CC_Z(n \geq 0) = 0$$

Figure 32:
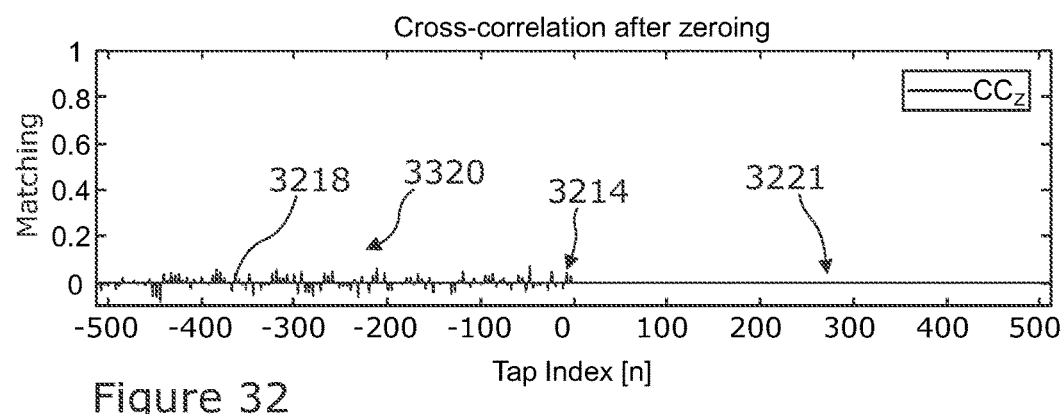

FIG. 32 illustrates a relative amplitude against tap index profile of modified cross-correlation function, $CC_Z$, 3218 based on the first cross-correlation function, $CC_{SRX}$, of FIG. 31. The modified cross-correlation function, $CC_Z$, 3218 has a plurality of side lobes 3220 at taps that occur earlier in time than the position of the main lobe 3214. However, the main lobe and subsequent (in terms of time) taps 3221 have zero amplitude.

c. The modified cross-correlation function, $CC_Z$ is convolved with the insecure channel estimate, C, to provide an equalization estimate, $EQ_C$:

$$EQ_C(n) = CC_Z(n) \otimes C(n)$$

Figure 33:
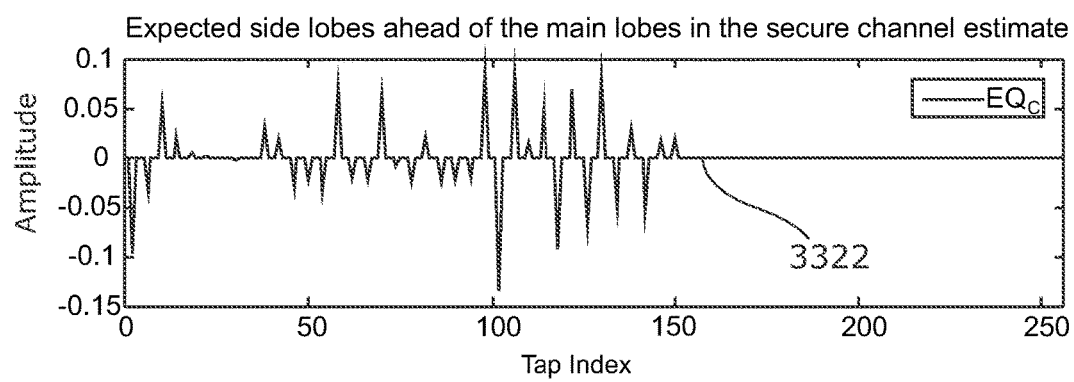

FIG. 33 illustrates an amplitude against tap index profile for the equalization estimate, $EQ_C$, 3322 calculated based on the modified cross-correlation function, $CC_Z$, of FIG. 32.

d. Assessable channel estimate information, $C_{PEQ}$, may be determined by subtracting the equalization estimate, $EQ_C$, from the secure channel estimate, $C_S$:

$$C_{PEQ} = C_S - EQ_C$$

Figure 34:
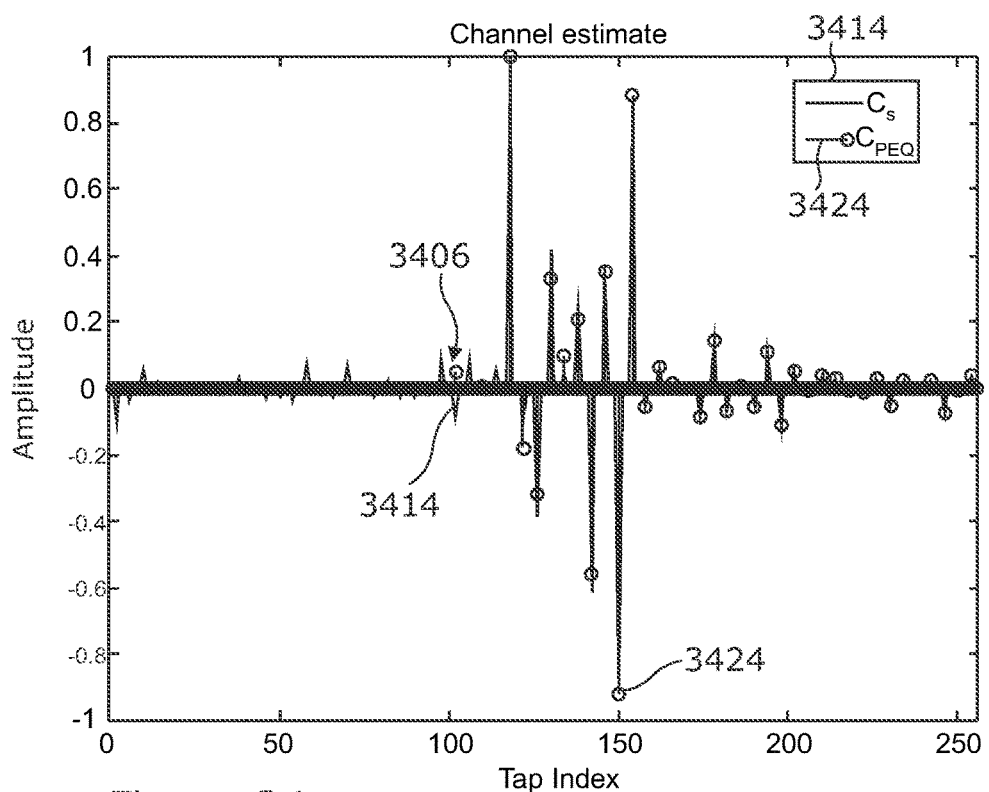

FIG. 34 illustrates relative amplitude against tap index profiles for a secure channel estimate, $C_S$, 3414 and assessable channel estimate information, $C_{PEQ}$, 3424 calculated based on the equalization estimate, $EQ_C$, of FIG. 33 and the secure channel estimate, $C_S$, 3414. $C_{PEQ}$ comprises all correlated multi-path components and side lobes due to non-ideal auto-correlation properties after a first path 3406 but no side lobes before the first path 3006. The weak first path 3406, which is not discernable in the secure channel estimate, $C_S$, 3014, is identifiable from the assessable channel estimate information, $C_{PEQ}$ and so may be validated using the assessable channel estimate information, $C_{PEQ}$.

The approaches described in example A to example D have the following advantages:

1) Non-ideal auto-correlation properties of the secure training sequence do not affect the outcome of the validated channel estimate because either the response (including side-lobes) of certain multi-path components are subtracted or the side lobes contribution of the multi-path components is subtracted or otherwise excluded from the validated channel estimate. The length of the secure training (validation) sequence may therefore be reduced without substantially adversely affecting channel estimate.
2) No additional dedicated hardware or host processing may be required to select or alter the validation sequence or the validation pattern.
3) All operations may be performed as a post-processing step using software in, for example, the validator 1170 described with reference to FIG. 11.

Example E is based on example C but uses the secure channel estimate, $C_S$, (without side-lobe correction) as a reference to calculate the contribution of the side-lobes, rather than the insecure channel estimate, C, as in example C. Example E is therefore suitable for use where no insecure channel estimate is available or if the insecure channel estimate should not be used as a reference for other reasons. The use of the secure training sequence introduces residual errors because side-lobes are inadvertently considered as valid multipath components. The residual error can be reduced by applying an iterative algorithm. As with examples A to D, example E may also be performed by the validator 1170 of the receiver of FIG. 11. One implementation of example E is described below with reference to steps (a) to (d):

a. The cross-correlation of the transmitted secure training sequence, $P_{STX}$, and the correlation pattern of the receiver, $P_{SRX}$ is calculated to provide a first cross-correlation function, $CC_{SRX}$:

$$CC_{SRX}(n) = P_{STX}(n) \otimes P_{SRX}(-n)$$

b. The amplitude of the main lobe of the first cross-correlation function, $CC_{SRX}$, is set to zero to provide a modified cross-correlation function, $CC_Z$:

$$CC_Z = CC_{SRX}; \ CC_Z(n=0) = 0$$

Thus far, the process is the same as that described previously with reference to FIGS. 27 and 28 for example C.

c. An approximated fully equalized channel estimate, $C_{AFEQ}$, is initialized as the secure channel estimate, $C_S$:

$$C_{AFEQ} = C_S$$

d. The following steps (i) and (ii) are repeated iteratively:
i. an intermediate equalization estimate, $EQ_E$, is obtained by cross-correlating the modified cross-correlation function, $CC_Z$ with the initialized approximated fully equalized channel estimate, $C_{AFEQ}$:

$$EQ_E(n) = CC_Z(n) \otimes C_{AFEQ}(n)$$

Figure 35:
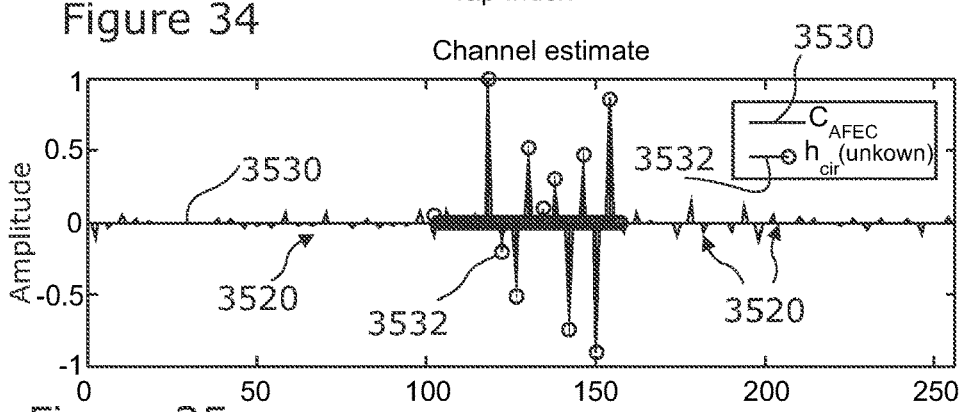
FIGS. 35 to 37 illustrate the effect of modifying the result of a cross-correlation of a validation pattern and a validation sequence in a fifth example (E) compensating for the effect of non-ideal autocorrelation properties of the validation sequence.

FIG. 35 illustrates the approximated fully equalized channel estimate, $C_{AFEQ}$, 3530 after one iteration together with the actual channel impulse response, $h_{cir}$, 3532 (which is as yet unknown) for comparison. Before the first equalization step, side lobes 3520 in the approximated fully equalized channel estimate, $C_{AFEQ}$, 3530 are clearly visible around the tap index positions of the actual channel.

Figure 36:
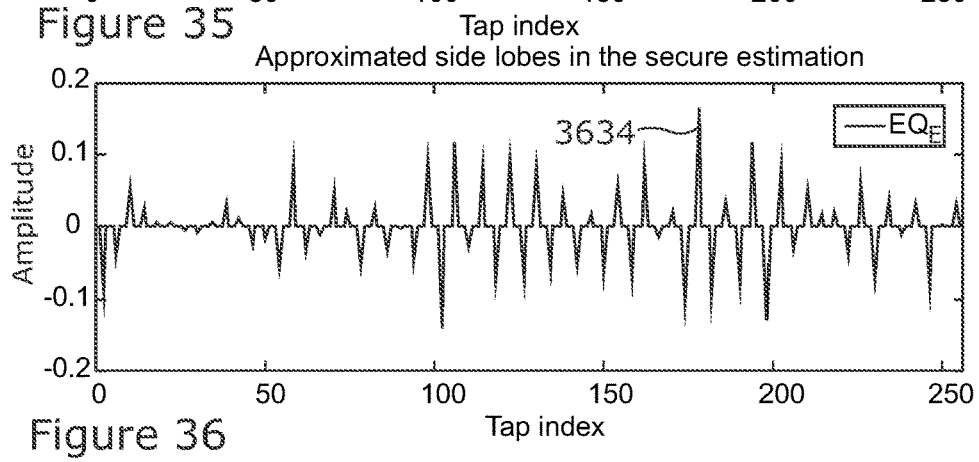

FIG. 36 illustrates the intermediate equalization estimate, $EQ_E$, 3634 obtained from the approximated fully equalized channel estimate, $C_{AFEQ}$, shown in FIG. 35.

ii. a new value for the approximated fully equalized channel estimate, $C_{AFEQ}$, is determined by subtracting the intermediate equalization estimate, $EQ_E$, from the secure channel estimate, $C_S$:

$$C_{AFEQ} = C_S - EQ_E$$

Figure 37:
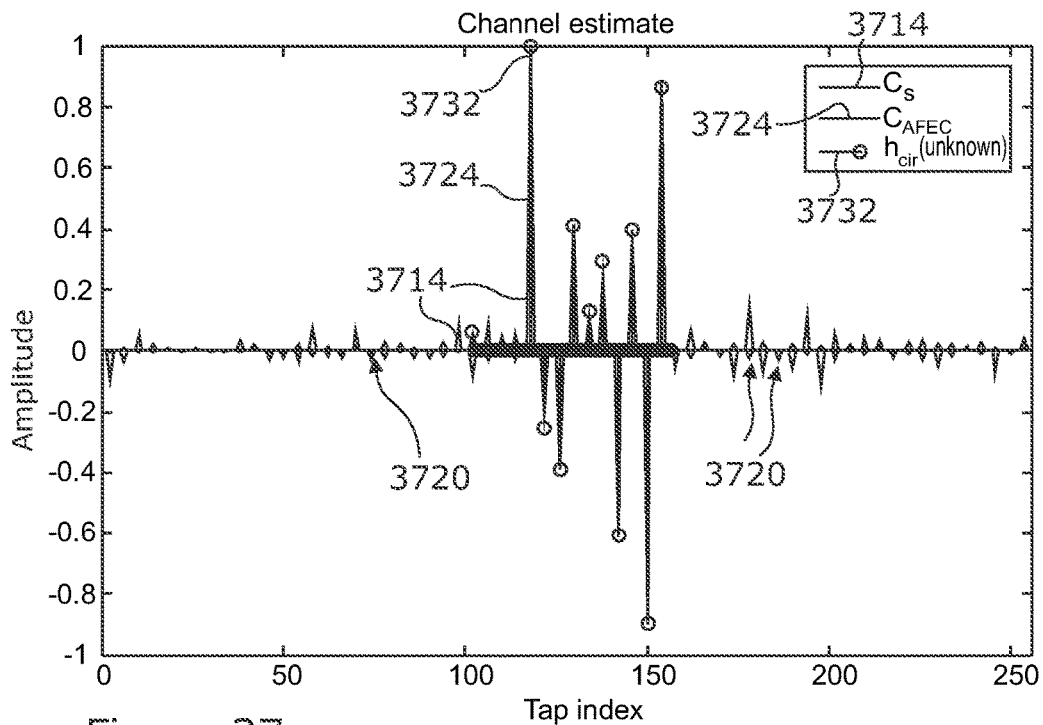

FIG. 37 illustrates the (initial) secure channel estimate, $C_S$, 3714, the actual channel impulse response, $h_{cir}$, 3732 and the approximated fully equalized channel estimate, $C_{AFEQ}$, after one iteration has been completed. The number of iterations performed in step (d) may be predefined. On completion of the iterations, the approximated fully equalized channel estimate, $C_{AFEQ}$, contains side-lobes 3720 of each multi-path component that have been attenuated to a level low enough to allow the detection of a weak first path. The first path detection can now be performed on the approximated fully equalized channel estimate, $C_{AFEQ}$.

Example F is based on example D but uses the secure channel estimate, $C_S$, (without side-lobe correction) as a reference to calculate the contribution of the side-lobes, rather than the insecure channel estimate, C, as in example D. This approach is similar to that described previously with reference to example E. Example F is therefore also suitable for use where no insecure channel estimate is available. The use of the secure channel estimate instead of the insecure channel estimate introduces residual errors because side-lobes are inadvertently considered as valid multipath components. The residual error can be reduced by applying an iterative algorithm. As with examples A to E, example F may also be performed by the validator 1170 of the receiver of FIG. 11. One implementation of example F is described below with reference to steps (a) to (d):

a. The cross-correlation of transmitted secure training sequence, $P_{STX}$, and the correlation pattern of the receiver, $P_{SRX}$ is calculated to provide the first cross-correlation function, $CC_{SRX}$:

$$CC_{SRX}(n)=P_{STX}(n)\otimes P_{SRX}(-n)$$

b. The amplitude of the main lobe and all trailing taps (in terms of time) of the first cross-correlation function, $CC_{SRX}$, is set to zero to provide modified cross-correlation function, $CC_Z$:

$$CC_Z=CC_{SRX}; CC_Z(n\geq 0)=0$$

Thus far, the process is the same as that described previously with reference to FIGS. 31 and 32 for example D.

c. An Intermediate equalization estimate, $EQ_F$, is determined by convolving the modified cross-correlation function, $CC_Z$ with either (A) the secure channel estimate, $C_S$, or (B) the approximated fully equalized channel estimate (which may be determined as described previously in relation to example E):

$$EQ_{FA}(n)=CC_Z(n)\otimes C_S(n) \quad (A):$$

$$EQ_{FB}(n)=CC_Z(n)\otimes C_{AFEQ}(n) \quad (B):$$

Figure 38:
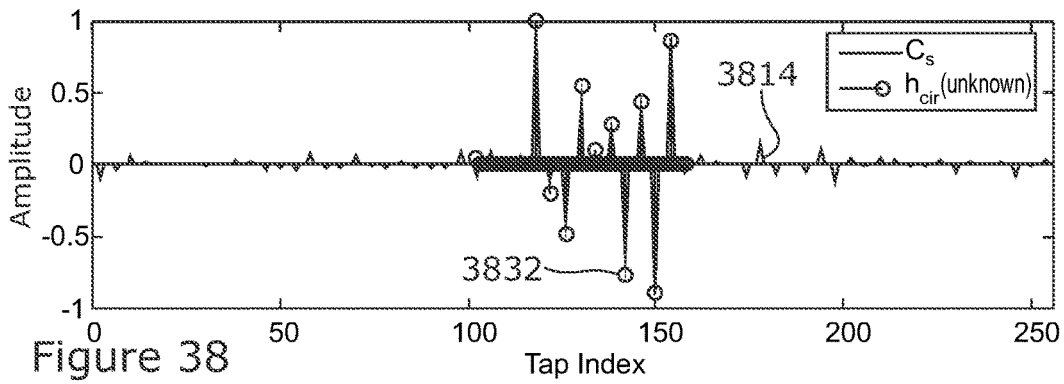
FIGS. 38 to 40 illustrate the effect of modifying the result of a cross-correlation of a validation pattern and a validation sequence in a sixth example (F) compensating for the effect of non-ideal autocorrelation properties of the validation sequence.

FIG. 38 illustrates the secure channel estimate, $C_S$, 3814 and the actual channel impulse response, $h_{cir}$, 3832 for example F (these profiles are the same as those described previously with reference to example E).

Figure 39:
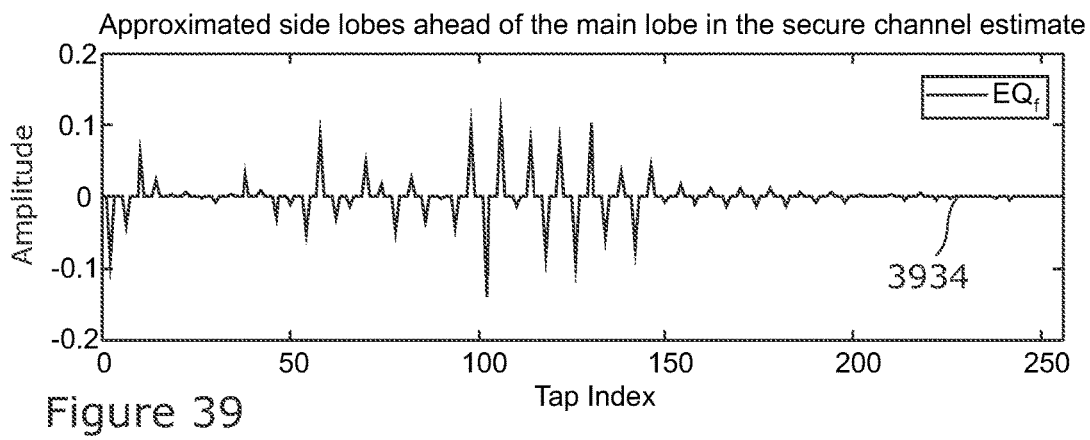

FIG. 39 illustrates the intermediate equalization estimate, $EQ_{FA}$, 3934 obtained by convolving (A) the modified cross-correlation function, $CC_Z$ and the secure channel estimate, $C_S$, 3814 of FIG. 38.

d. An approximated partially equalized channel estimate, $C_{APEQ}$, is determined by subtracting the intermediate equalization estimate, $EQ_F$, from the secure channel estimate, $C_S$ $$C_{APEQ}=C_S-EQ_{FA/FB}$$

Figure 40:
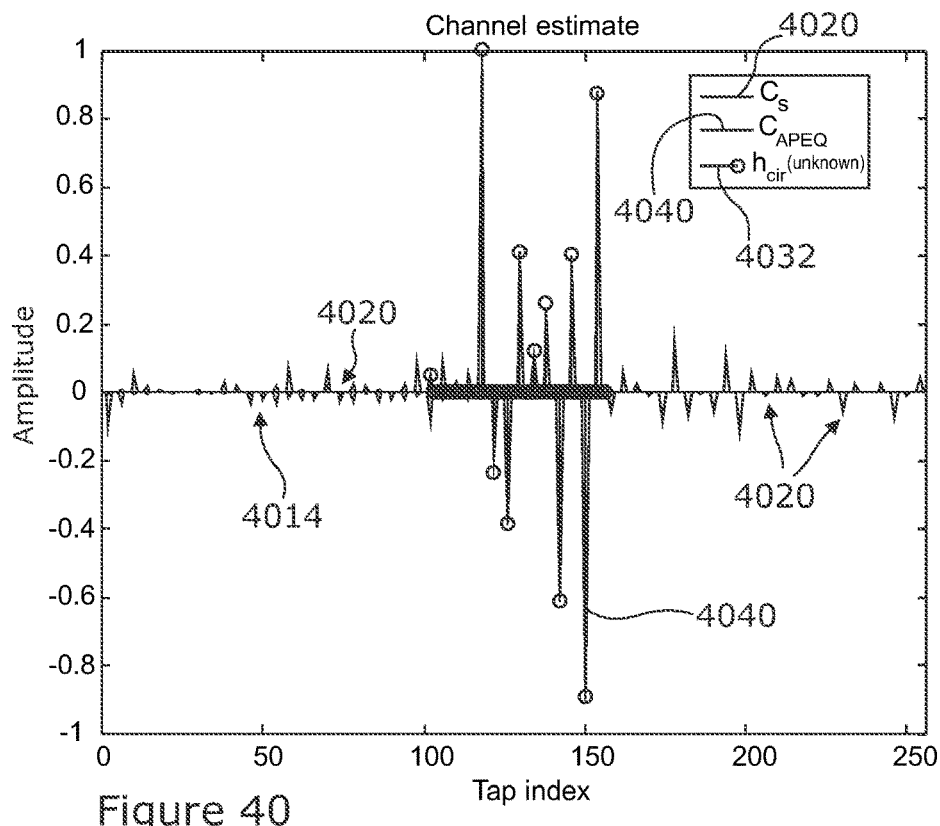

FIG. 40 illustrates the (initial) secure channel estimate, $C_S$, 4014, the actual channel impulse response, $h_{cir}$, 4032 and the approximated partially equalized channel estimate, $C_{APEQ}$, 4040 generated from the intermediate equalization estimate, $EQ_{FA}$, 3934. The approximated partially equalized channel estimate, $C_{APEQ}$, 4040 contains attenuated side-lobes 4020 ahead of the main lobe of each multi-path component with a level low enough to allow a detection of a weak first path (no strong side-lobe interference before the first path).

The approaches described in example E and example F provide all of the advantages previously described in relation to examples A to D, and in addition:

1) No insecure channel estimate (which may be determined using the preamble of the packet) is required and so this processing step may be omitted.

2) Using the secure channel estimate itself rather than the insecure channel estimate offers better robustness for changes in the channel impulse response between non-secure and secure estimate (when the device moves, for example).

Example G modifies the validation pattern, $P_{SRX}$, to apply a partial equalization of the cross-correlation, $CC_{SRX}$, thereby reducing the amplitude of the side-lobes in the region of interest. One implementation of example G which optimizes the side-lobes ahead of the main lobe is described below with reference to steps (1) to (4):

1) Define the maximum expected delay spread between the time of arrival of the earliest possible significant multipath component, which is typically the line-of-sight component and the time of arrival of the main signal, with $N_d$ chips in the channel impulse response.
2) Generate a random sequence $P_{STX}$ with $K*N_d$ chips, where K is a positive integer.
3) Calculate and save auto-correlation of the secure training sequence: $CC_{STX}(n)=P_{STX}(n)\otimes P_{STX}(-n)$ for $N_d-1$ elements, or taps, before the main-lobe ($-(N_d-1)\leq n<0$).

Figure 41:
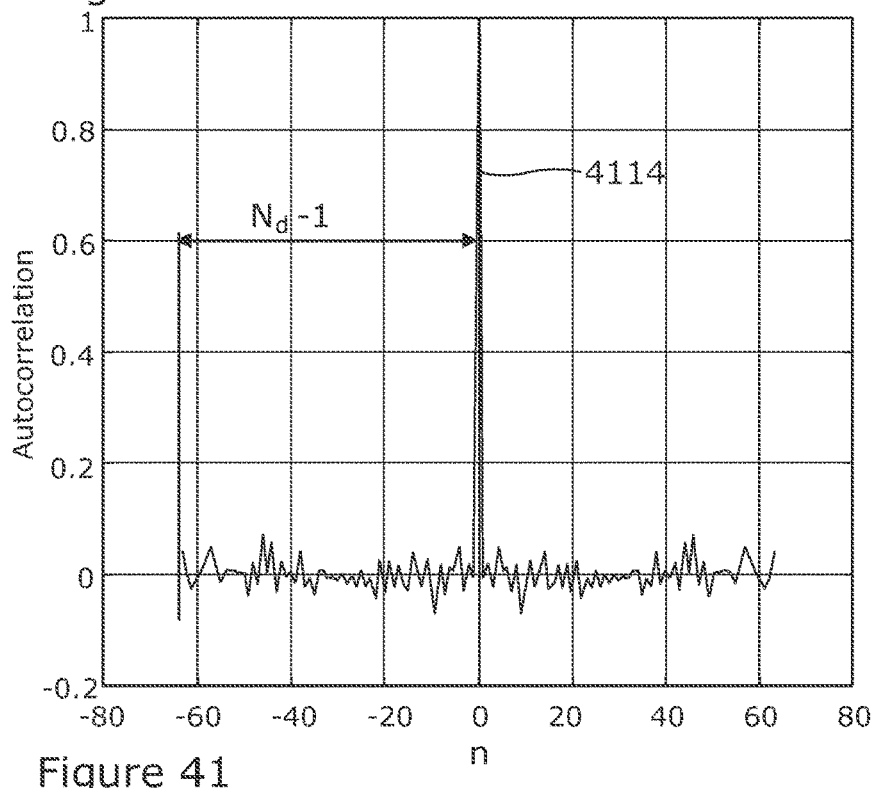
FIGS. 41 to 43 illustrate the effect of the modifying a validation pattern by a seventh example (G) in order to compensate for the effect of non-ideal autocorrelation properties of the validation sequence.

FIG. 41 illustrates an example of an auto-correlation of the secure training sequence, $CC_{STX}$, with $N_{d-1}$ taps before the main lobe 4114.

4) Calculate the RX pattern:
   a. Initialize the correlation pattern of the receiver, $P_{SRX}$, with the correlation sequence of the transmitter, $P_{STX}$: $P_{SRX}=P_{STX}$.
   b. Initialize cross-correlation, $CC_{RX}$, of the transmitted secure training sequence with the correlation pattern of the receiver using the auto-correlation function of the secure training sequence, $CC_{STX}$: $CC_{SRX}=CC_{STX}$
   c. Split $P_{SRX}$ in K segments with $N_d$ chips: $P_{SRX}(n)=\{S_0, S_1, S_{K-1}\}$ (in order to reduce computational effort)
   d. Define an optimization criteria (e.g. energy of the cross-correlation side-lobes)
   e. For every segment $S_l$ of the correlation pattern of the receiver, $P_{SRX}$, check the effect of inverting M chips.
   f. For every inverted chip $S_l(i)$:
      i. Calculate new cross-correlation result:

$$\widetilde{CC_{SRX}}=CC_{SRX}-2\cdot S_l(i)\cdot\{P_{STX}(l\cdot K-N_d+i+1),\ldots P_{STX}(l\cdot K+i)\}.$$

ii. If the optimization criteria shows an improvement for $\widetilde{CC_{SRX}}$, compared to $CC_{SRX}$ then use $\widetilde{CC_{SRX}}$ as the new $CC_{SRX}$:

$$s_l(i)=-S_l(i)$$

$$CC_{SRX}=\widetilde{CC_{SRX}}$$

The computational effort to calculate the correlation pattern of the receiver, $P_{SRX}$, can be reduced to the calculation of $N_d-1$ elements of the auto-correlation $CC_{STX}$, $K\cdot M\cdot(N_d-1)$ scalar additions and $K\cdot M$ calculations of the optimization criteria. In addition, by only optimizing the side-lobes ahead of the main lobe, the computational effort may also be reduced because the side lobes after the main lobe may not be of interest as they cannot represent the shortest signal path.

Figure 42:
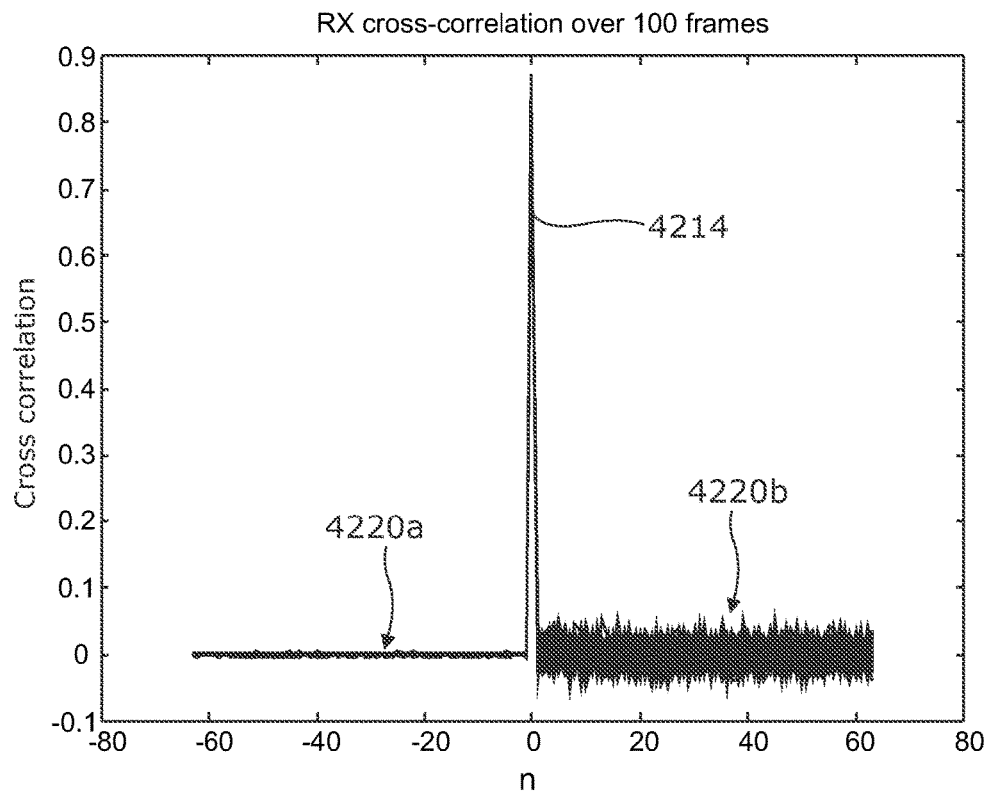

FIG. 42 illustrates amplitude against tap index profiles for the cross-correlation, $CC_{SRX}$, of transmitted secure training sequence with the correlation pattern of the receiver over 100 frames of transmission for an example where K=64, M=16 and $N_d$=64. The amplitude of the side lobes 4220a ahead of (earlier in time than) the main lobe 4214 is substantially reduced compared to the uncorrected side lobes 4220b that are present after the main lobe 4214.

Figure 43:
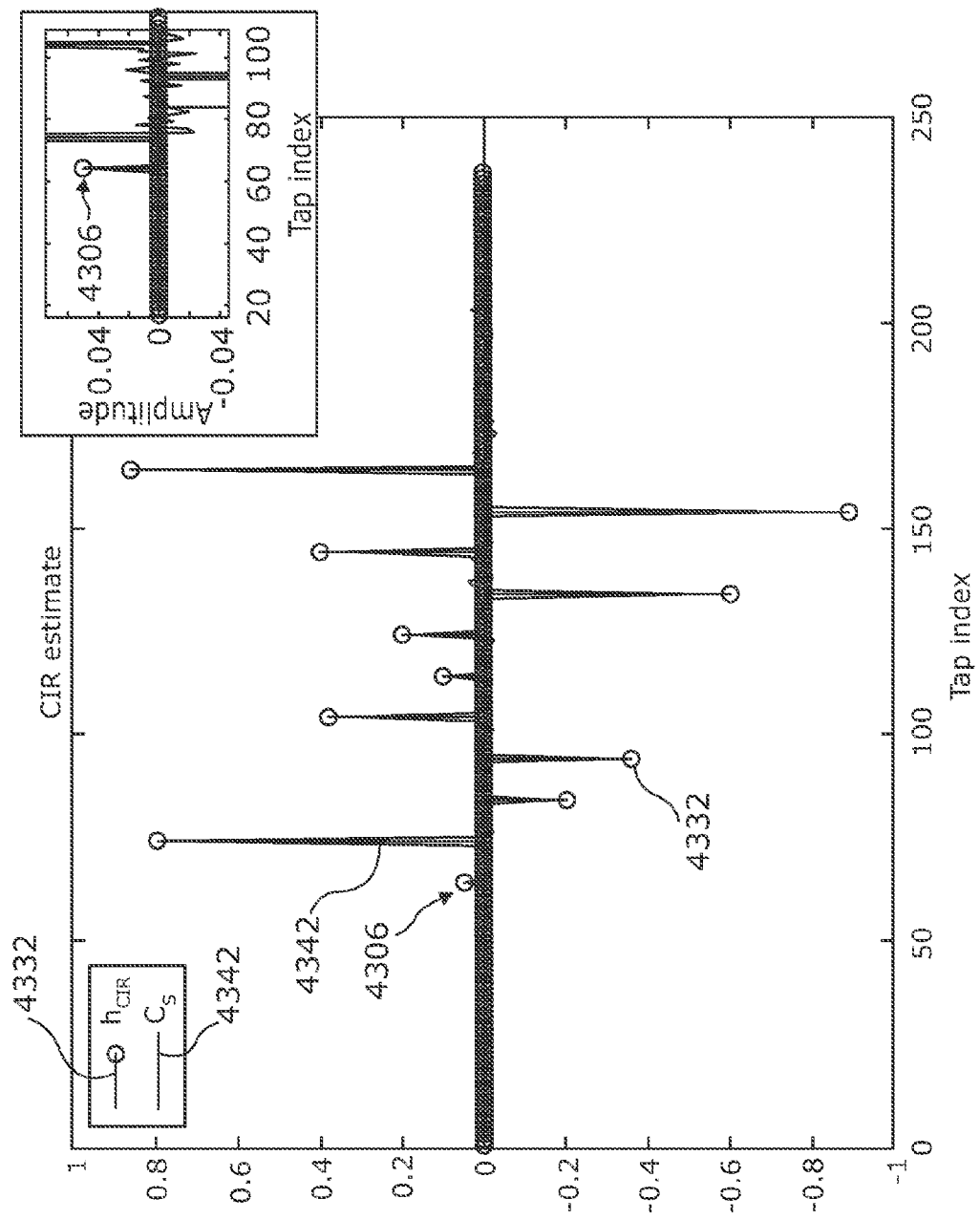

FIG. 43 illustrates the effect of example F on the obtained channel estimate 4342. As can be seen the weak first path is now not hidden anymore by side lobes of stronger paths. By increasing K and/or M the cross-correlation properties may be further be improved.

Example G may be implemented in the code generator 810 described previously with reference to FIG. 11, for example. Alternatively, a RX pattern calculation unit may be provided to generate the correlation pattern of the receiver, $P_{SRX}$, based on the code generated by the code generator 810.

Figure 44:
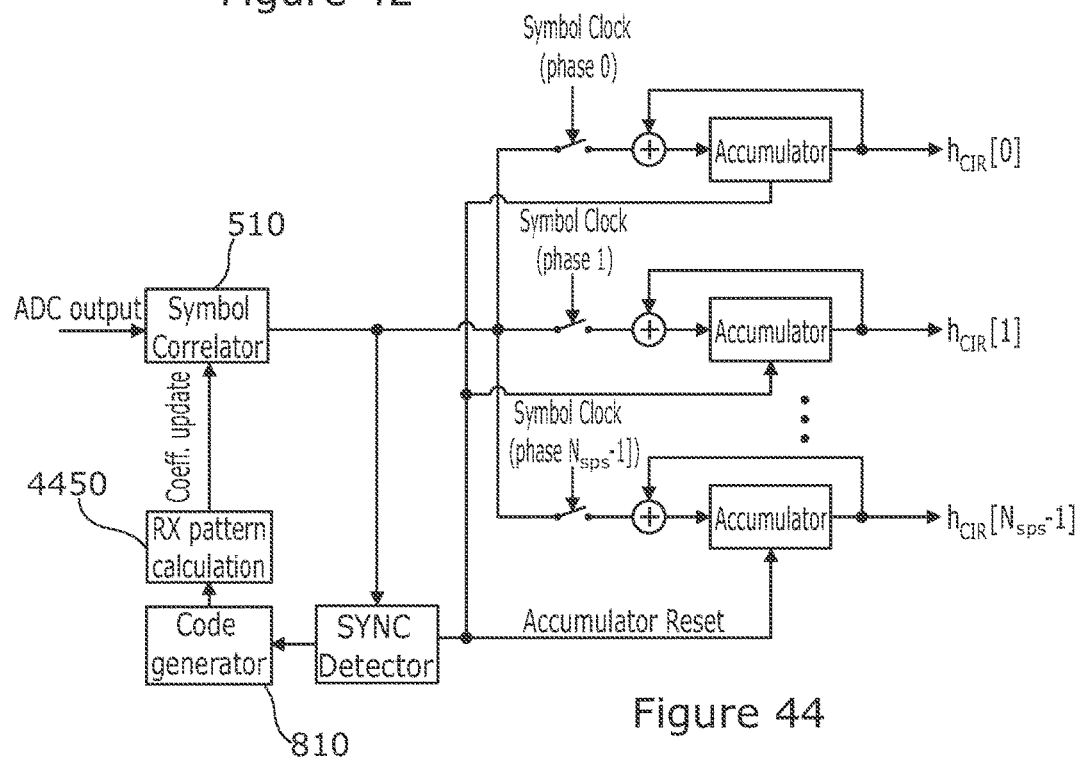
FIG. 44 relates to a simplified block diagram of a portion of a channel estimate generation component according to the seventh example (G).

FIG. 44 illustrates a portion of a channel estimate generator component which is similar to that described previously with reference to FIG. 11 and further includes a RX pattern Calculation unit 4350 configured to receive the output of the code generator 810 and provide the correlation pattern, $P_{SRX}$, to the symbol correlate 510.

The approach described in example G provides the additional advantages:

1) No post-processing is required.

Example H, which may be implemented at the transmitter, comprises applying time hopping or pulse position modulation to the validation sequence in the packet in order to reduce the auto-correlation side lobes in the secure training sequence. The receiver in this example is also configured to accept such modified signals, as may be achieved by conventional pulse position demodulation, for example.

The approaches described in example G to example H have the following advantages:

1) The cross-correlation properties of the validation pattern are optimized or improved to reduce the side-lobes 2) No post-processing is required in order to remove unwanted side-lobes 3) No reference channel estimate is required in order to remove the cross-correlation side-lobes 4) The modified validation pattern enable improved robustness for changes in the channel impulse response (when the device moves, for example).

Because the illustrated examples may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In the foregoing specification, the invention has been described with reference to specific examples of examples. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different examples may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative examples may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the example illustrated in FIG. 5, the sequence detector and code generator 535 has been illustrated and described as a single logical block. However, it will be appreciated that the sequence detection and code generation functions may be implemented in separate functional blocks.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative examples may include multiple instances of a particular operation, and the order of operations may be altered in various other examples.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing module for a communication receiver device configured to receive a signal transmitted by a transmitter device, the processor module comprising:
 a channel estimate generation component configured to output channel estimate information for the received signal; and
 a timestamping module configured to determine a Time-of-Arrival, ToA, measurement for a packet with the received signal based at least partly on the channel estimate information for the received signal output by the channel estimate generation component, wherein the channel estimate generation component comprises a validation component configured to identify a validation sequence within the packet within the received signal for which the ToA measurement is to be determined, identify a section of the packet containing the validation sequence, and perform cross-correlation between at least a part of the received signal of the validation sequence within the packet and at least a part of the validation pattern to generate validated channel estimate information.

2. The processing module of claim 1, wherein the validation component is configured to compensate for non-ideal auto-correlation properties of the validation sequence by one or more of modifying a result of the cross-correlation between at least a part of the validation sequence within the packet and at least a part of the validation pattern, using unvalidated channel estimate information, or modifying the validation pattern and thereby modifying the cross-correlation of the received signal of the validation sequence with the validation pattern in order to generate the validated channel estimate information.

3. The processing module of claim 1, wherein the validation component is configured to independently derive the validation sequence that corresponds to the received validation sequence, perform cross-correlation between at least a part of the derived validation sequence and at least a part of the validation pattern, select at least one tap in the cross-correlation between at least a part of the received signal of the validation sequence within the packet and at least a part of the validation pattern, and modify one or more values of the cross-correlation of the derived validation sequence with the validation pattern associated with at least one tap.

4. The processing module of claim 1, wherein the validation component is configured to independently derive the validation sequence that corresponds to the received validation sequence, perform cross-correlation between at least a part of the derived validation sequence and at least a part of the validation pattern, receive unvalidated channel estimate information for the received signal, and generate intermediate channel estimate information based on a convolution of the unvalidated channel estimate information and the cross-correlation of the derived validation sequence with the validation pattern.

5. The processing module of claim 4, wherein the validation component is configured to select at least one channel estimate tap for which channel estimate information is to be generated based on the unvalidated channel estimate information, and modify one or more values of the unvalidated channel estimate information associated with the at least one channel estimate tap.

6. The processing module of claim 4, wherein the validation component is configured to subtract the validated channel estimate information from the intermediate channel estimate information, or vice versa, in order to output channel estimate information.

7. The processing module of claim 2, wherein the validation component is configured to modify the derived validation sequence to provide a modified validation pattern, compare a correlation property of at least part of the derived validation sequence with a corresponding property of the modified validation pattern, use the modified validation pattern to generate validated channel estimate information after the correlation property of the modified validation pattern is better than the correlation property of the derived validation sequence.

8. The processing module of claim 7, wherein the validation component is configured to separate the derived validation pattern into segments, and generate the modified validation pattern by inverting one or more bits of each segment.

9. The processing module of claim 8, wherein the validation component is configured to only modify or compare correlation properties for segments associated with a shorter time-of-flight than an identified tap.

10. The processing module of claim 2, wherein time hopping or pulse position modulation is applied to the validation pattern.

11. The processing module of claim 2, wherein the validation component is configured to authenticate an origin of the received signal based on a comparison of the validation sequence and the validation pattern.

12. The processing module of claim 11, wherein the validation component is configured to demodulate one or more sub-segments of the received signal of the validation sequence within the packet in order to authenticate the origin of the received signal.

13. A processing module for a communication transmitter device configured to transmit a signal to a received device comprising a packet for which a Time-of-Arrival, ToA, measurement is to be determined, the processing module being configured to identify a validation sequence within the packet for which a ToA measurement is to be determined, identify a section of the packet containing the validation sequence, and generate the packet comprising the validation sequence.

14. The processing module of claim 13, wherein time hopping or pulse position modulation is applied to the validation sequence in the packet in order to improve auto-correlation of the validation sequence.

15. The processing module of claim 13, further configured to modulate at least part of the validation sequence to enable authentication of the processing module by the received device.

* * * * *